US009712035B1

(12) United States Patent
Bango et al.

(10) Patent No.: US 9,712,035 B1
(45) Date of Patent: Jul. 18, 2017

(54) ELECTROSPRAY BASED DIFFUSION PUMP FOR HIGH VACUUM APPLICATIONS

(75) Inventors: Joseph J. Bango, New Haven, CT (US); Michael E. Dziekan, Bethany, CT (US); Paulo Lozano, Arlington, MA (US)

(73) Assignee: CONNECTICUT ANALYTICAL CORPORATION, Bethany, CT (US)

( * ) Notice: Subject to any disclaimer, the term of this patent is extended or adjusted under 35 U.S.C. 154(b) by 880 days.

(21) Appl. No.: 13/317,570

(22) Filed: Oct. 21, 2011

Related U.S. Application Data

(60) Provisional application No. 61/455,579, filed on Oct. 21, 2010.

(51) Int. Cl.
```
H02K 44/00      (2006.01)
H02K 44/04      (2006.01)
H02K 44/06      (2006.01)
F04B 35/04      (2006.01)
B64G 1/40       (2006.01)
```
(52) U.S. Cl.
CPC ............. *H02K 44/00* (2013.01); *F04B 35/04* (2013.01); *H02K 44/04* (2013.01); *H02K 44/06* (2013.01); *B01L 2400/0406* (2013.01); *B01L 2400/0415* (2013.01); *B64G 1/405* (2013.01)

(58) Field of Classification Search
CPC ........ H02K 44/00; H02K 44/02; H02K 44/04; B01L 2400/0406
USPC .... 417/48, 50; 204/600, 601, 450, 452, 603; 60/200.1, 202, 203.1; 239/3; 250/288; 422/504, 505, 507
See application file for complete search history.

(56) References Cited

U.S. PATENT DOCUMENTS

| 2,397,591 | A | * | 4/1946 | Becker | ............... F04F 9/00 417/154 |
|---|---|---|---|---|---|
| 3,173,246 | A | * | 3/1965 | Norgren | ............... F03H 1/0012 239/14.1 |
| 4,086,031 | A | | 4/1978 | Kuypers | |

(Continued)

FOREIGN PATENT DOCUMENTS

WO    WO/2006/091743    8/2006

OTHER PUBLICATIONS

Web page http://www.nd.edu/~cmmd/technology/Integrated-DCPumpElectrospray.shtml.

(Continued)

*Primary Examiner* — Alexander Comley
(74) *Attorney, Agent, or Firm* — James F. Kirk

(57) ABSTRACT

An electrospray diffusion pump with an upper vacuum chamber coupled to a lower vacuum chamber by a cylinder having an aperture in the upper chamber at the center of a conductive extractor ring. A conductive tube is positioned in the upper chamber and is axially aligned with the conductive extractor ring. The conductive tube is coupled to receive a conductive or semi-conductive spray fluid. A voltage source is coupled between the conductive tube and the extractor ring and adjusted to form a Taylor Cone that provides a jet of charged droplets at the tip of the conductive tube, the charged droplets are attracted to the extractor ring and pass into the aperture, then through the cylinder into the second chamber. The charged droplets have nearly zero vapor pressure and transfer ambient gas at a first pressure from the upper chamber to the lower chamber at a lower pressure.

3 Claims, 15 Drawing Sheets

(56) References Cited

U.S. PATENT DOCUMENTS

| | | | | |
|---|---|---|---|---|
| 4,140,438 A * | 2/1979 | Landfors | F04F 9/00 | 417/153 |
| 4,242,052 A * | 12/1980 | Marchaj | F04B 23/14 | 417/154 |
| 5,608,217 A * | 3/1997 | Franzen | G01N 30/7266 | 250/281 |
| 6,297,499 B1 * | 10/2001 | Fenn | H01J 49/167 | 250/288 |
| 6,454,938 B2 * | 9/2002 | Moon | G01N 30/6095 | 204/600 |
| 6,649,907 B2 * | 11/2003 | Ebeling | H01J 49/044 | 250/288 |
| 6,690,006 B2 * | 2/2004 | Valaskovic | G01N 30/7266 | 250/288 |
| 6,787,766 B2 * | 9/2004 | Schultz | H01J 49/167 | 210/243 |
| 6,822,231 B2 * | 11/2004 | Schultz et al. | | 250/288 |
| 6,858,842 B2 * | 2/2005 | Moon | G01N 30/6095 | 210/198.2 |
| 7,391,020 B2 * | 6/2008 | Bousse | B05B 5/025 | 250/281 |
| 7,518,108 B2 * | 4/2009 | Frey | H01J 49/0045 | 250/281 |
| 7,827,779 B1 * | 11/2010 | Krishnan | F03H 1/0012 | 313/360.1 |
| 7,982,183 B2 * | 7/2011 | Makarov | H01J 49/065 | 250/283 |
| 8,122,701 B2 * | 2/2012 | Song | B05B 5/025 | 313/359.1 |
| 8,267,914 B1 * | 9/2012 | Chang | A61M 11/00 | 128/200.14 |
| 2003/0066969 A1 * | 4/2003 | De La Mora | B64G 1/402 | 250/423 R |
| 2003/0183757 A1 * | 10/2003 | Kato | G01N 27/62 | 250/281 |
| 2003/0209005 A1 * | 11/2003 | Fenn | B05B 5/0255 | 60/203.1 |
| 2004/0226279 A1 * | 11/2004 | Fenn | F02K 9/52 | 60/203.1 |
| 2006/0006457 A1 | 1/2006 | Chang et al. | | |
| 2006/0219897 A1 * | 10/2006 | Schneider | H01J 49/164 | 250/288 |
| 2008/0048107 A1 * | 2/2008 | Mcewen | H01J 49/0422 | 250/282 |
| 2008/0152509 A1 * | 6/2008 | Chang | F04B 43/043 | 417/51 |
| 2009/0113872 A1 * | 5/2009 | Demmons | B05B 5/0255 | 60/202 |
| 2010/0187115 A1 * | 7/2010 | Posner | F04B 19/00 | 204/627 |
| 2012/0144796 A1 * | 6/2012 | Marrese-Reading | B64G 1/405 | 60/202 |

OTHER PUBLICATIONS

Web page, Wikipedia, http://en.wikipedia.org/wiki/Colloid_thruster.

* cited by examiner

ELECTROSPRAY BASED DIFFUSION PUMP FOR HIGH VACUUM APPLICATIONS

This application claims priority from Provisional Patent Application Ser. No. 61/455,579, filed on Oct. 21 2010 for ELECTROSTATIC BASED DIFFUSION PUMP FOR HIGH VACUUM APPLICATIONS, having common inventors with this application.

BACKGROUND

Field of Invention

This invention relates in general to pumps and in particular to vacuum pumps.

Background Description of Prior Art

Over the past decade, especially since the terrorist attacks of 9/11, there has been an increasing demand for sensitive chemical, biological, and explosive detection devices. The vast majority of these detection devices have presented challenges to the scientists and design engineers to translate what has previously been the domain of the laboratory, into small hand-held portable devices. Of the family of detectors most widely used to meet the challenge, none has greater potential, yet been more difficult to miniaturize into a portable form factor than the mass spectrometer. Mass spectrometers, unlike ion mobility (IMS), require a partial pressure region to scan for a given mass number indicative of the trace species of interest. Probably the most significant hurdle yet to overcome is how to create a small, cost effective, low power vacuum system. Over the past 30+ years, no significant advance in vacuum pump concepts save for the turbomolecular pump, have been realized. The disclosed invention offers a potential for game-changing new technology that could make the turbo pump obsolete in many applications while promising to provide significant cost savings with unprecedented reliability and longevity.

Mass spectrometers necessitate a partial pressure zone to allow for the process of mass characterization of the analyte under consideration. For proper operation of a mass spectrometer, the normally neutral molecules must first be changed into charged ions before attempting this characterization. By transforming neutral molecules into charged molecules, one now has the ability to control the trajectories and destinations of charged species by appropriate combinations of electric and magnetic fields. In addition, detectability is generally much greater for ions than for neutral molecules because each ion gives rise to at least one electron in a primary signal current that can be greatly amplified by well known techniques. Moreover, ion-electron multipliers can produce millions of electrons in signal current for each incident ion. It is true that some optical techniques, e.g. laser induced fluorescence can sometimes provide larger signal/molecule ratios than can ion-multiplication techniques but the conditions required for such sensitivity are often more difficult to achieve, vary much more from species to species, and require more expensive gear than is generally the case with ions. The target background pressure for most mass spectrometers is generally $1 \times 10^{-6}$ Torr. Up until about 20-30 years ago, most vacuum system pumping was performed by a vapor-jet pump, sometimes referred to as an oil diffusion pump. Both terms are correct, in that a heated oil of limited vapor pressure with an oil molecular mass at least 17 times that of air, is configured to produce a high velocity oil vapor jet into which air molecules diffuse and thus undergo collisions with the high translational energy of the oil jet. Compression of the air by repeated oil molecular collisions drives the air molecules onto the pump walls which are cooled and results in condensation of the oil and entrained air species. A fore pump exhausts the residual air gas and the oil is re-heated so the process can repeat itself. In practice, it generally takes about 5 oil molecules to pump one molecule of air. While diffusion pumps have proven themselves capable of removing a vast gas load—far more than equivalent sized turbomolecular pumps—there are significant drawbacks. First of all, oil diffusion pumps are not "instant-on" devices like a turbo pump. It can take many hours before a diffusion pump heats up enough before sufficient pumping is realized. Next, diffusion pumps are notoriously inefficient power wise, having an efficiency of only about 1%. Of all the power used by the electric heaters to heat the oil, most of this energy ends up as waste via the cooling coils used for oil condensation. Because of the heating required to heat the oil, a diffusion pump can't be readily shut down either. If one needed access to the partial pressure region of a mass spectrometer, a gate valve would be needed to isolate the diffusion pump, lest explosive flash of the oil and subsequent chamber contamination with oil would transpire. Finally, diffusion pumps are by their nature axis sensitive. Tilting a diffusion pump risks exposing the heater and burning it out or dispensing the hot oil into the vacuum chamber. In the least worst-case scenario, the pump would simply cease to function if the oil supply were interrupted by a change in orientation. In spite of all these drawbacks the diffusion pumps are still widely used due to their great pumping speed, simplicity, reliability (many operate continuously for years at a time), and low cost Given all of the limitations of ordinary oil diffusion pumps, it is not surprising that the development of the turbomolecular pump was welcomed in the vacuum industry. The turbomolecular pump is very much like the compressor section of a jet engine. Marsbed Hablanian, one of the leading scientists in vacuum technology today, describes the evolution of the turbo pump as follows. "Turbomolecular pumps are essentially axial-flow compressors designed for pumping rarefied gases. Original designers adapted more or less traditional axial-flow compressor stage arrangements using mathematical modeling that was based on studies of molecular trajectories inside alternating rotating and stationary blade rows. Recent design trends lean toward hybrid stage arrangements, which incorporate turbomolecular and turbodrag stages within the same body and mounted on the same shaft. The new pumps achieve much higher compression ratios (10 to 100 times), permitting higher discharge pressures and allowing the use of oil-free backing pumps. When engineers first encounter high-vacuum technology, they sometimes have difficulty in understanding molecular flow concepts but, after a few years, they seem to have more difficulty in associating the rarefied gas flow with the more common higher pressure viscous flow. There are similarities, however, between the two and the appreciation of such similarities can lead to better designs. High-vacuum pump technology was developed mostly by experimental physicists, electrical engineers, and some chemists. As a result, unique design concepts developed and the descriptive terminology is not well-related to mechanical engineering and, specifically, to fluid mechanics. Even worse, because different vacuum pumps have been developed by different persons in different times, the terminology used to describe the performance of various pumps is different. For example, even though turbomolecular and vapor jet pumps are very similar in their basic performance, the compression ratio values are firmly associated with turbomolecular pumps but almost never mentioned in relation to vapor jet pumps."

When the pressure is high (near atmospheric) and the rotor velocity is low, the pumping action will be extremely inefficient. If any pressure difference is established due to drag at the surface, it will be lost immediately because of backflow some distance from the rotor. But under molecular flow conditions and the peripheral rotor velocity approaching the average velocity of gas molecules, a significant pressure difference can be maintained. Every collision with the rotor will send the molecule back to the discharge area. The disk type has the disadvantage of lower tangential velocity in the spiral grooves near the center, but is easier to balance and has a single rotor. The pumping speed of early pumps was low. The art of making high-speed rotating machinery had not yet been developed (modern turbos spin typically from 40,000 RPM to over 200,000 RPM—the smaller the pump, the faster the rotor speeds). Modern turbomolecular pumps of open, thin bladed, axial-flow type appeared in the early sixties. An axial-flow compressor consists of a set of alternating bladed rotors and stators. The problem with turbomolecular pumps is the complexity and cost of manufacture, and some potential safety issues especially with regards to portable applications. The tolerances are extremely critical for both rotors and stators. In addition, life issues of the bearings can impact any portable design, and as a turbo pump often represents the highest cost item in any spectrometer system, replacement essentially requires scraping of a portable mass spectrometer due to the high cost of a new turbo. Some of the smallest turbos, from 5 to 70 liters/sec, have an average price ranging from $5,000-$10,000 depending on the quantity purchased by an original equipment manufacturer (OEM). In addition, as the size of a turbomolecular pump is reduced, the rotor speed must be increased to have the tip velocity match the thermal velocity of the gas to be pumped. The loads thus induced can make for rather spectacular system failures throwing shrapnel everywhere.

Another issue for small handheld instruments is the effect due to torque-induced gyroscopic precession. Given the extremely high rotational rotor speeds in miniature turbos, any sudden movement or jarring by the user of an instrument would immediately be accompanied by a gyroscopic "pitching" of the device. In a severe case, if the inertia of the rotor were high enough, the handheld unit could be twisted out of the user's hands and dropped. Dropping a portable mass spectrometer is bad enough, but with an internal turbo spinning at over 200,000 RPM, shaft/blade flexure could cause a turbo explosion, sending shrapnel inside the device. Even if an instrument were not dropped but accidentally hit a hard surface briefly such as a table, the transient force could be many thousands of g's for a millisecond—enough to crash a spinning turbo. In this sense, walking around with a handheld device with a running turbomolecular pump would be akin to walking around with a grenade with the pin ready to fall out!

Prior research by the inventors and others using electrosprays for use in micro-satellite propulsion, also known as "colloidal" propulsion, has demonstrated that high velocity jets of charged droplets can provide thrust due to momentum transfer. The key inventive element in the disclosed invention is the realization that the same electrospray micro-satellite propulsion research can be adapted into creating a new type of vacuum diffusion pump. This electrospray pump, instead of using heated oil vapor to interact with molecular gas flow in a vacuum system, employs the electrospray jet to accomplish the same feat, albeit without the added power expense of heating oil as in a contemporary oil diffusion pump. What is currently being done for colloidal propulsion parallels the requirements for an effective vapor-jet pump. The attractive feature of colloidal droplets produced by the electrospray phenomena is significant. Principal among these is the lack of volatility of the working fluid (as a volatile propellant would evaporate in the vacuum of space), no need for diffusion pump heater concepts, and the ability to produce ions or droplets at a known velocity that exceed the thermal velocity of target pump gases while only using milliwatts of power.

DESCRIPTION OF THE PRIOR ART

The prior art reveals many references to the design and construction of oil and mercury diffusion pumps or vapor jet pumps. The general configuration of an oil or other heated liquid diffusion pump all follow essentially the same structure. A vessel contains the working fluid which is in contact with a heated surface, whereby the heated fluid is converted into a vapor such that the vapor jets can be directed toward a surface that is cooled such that fluid condensation transpires. Examples of such pumps are numerous, and by way of example, reference is made to U.S. Pat. No. 2,397,591 to Becker, U.S. Pat. No. 4,086,031 to Keypers, U.S. Pat. No. 4,140,438 to Landfors, and U.S. Pat. No. 4,242,052 to Marchaj.

Of recent date, there has been a renewed interest in using electrosprays of nonvolatile and conductive fluids for small spacecraft propulsion. However, until the disclosed invention, the momentum transfer capacity of charged droplets created using electrosprays has not been applied to sweep away background gases in a vessel, thus creating a pumping effect. During numerous experiments conducted by the inventors, it has been discovered that electrosprays at atmospheric pressure can create a negative pressure region surrounding the electrospray jet by inducing convection. Under vacuum, the pumping effect transitions from viscous flow to a molecular flow, the latter being the result of droplet-ambient gas collisions.

DETAILED DESCRIPTION OF THE INVENTION

Figure 1:
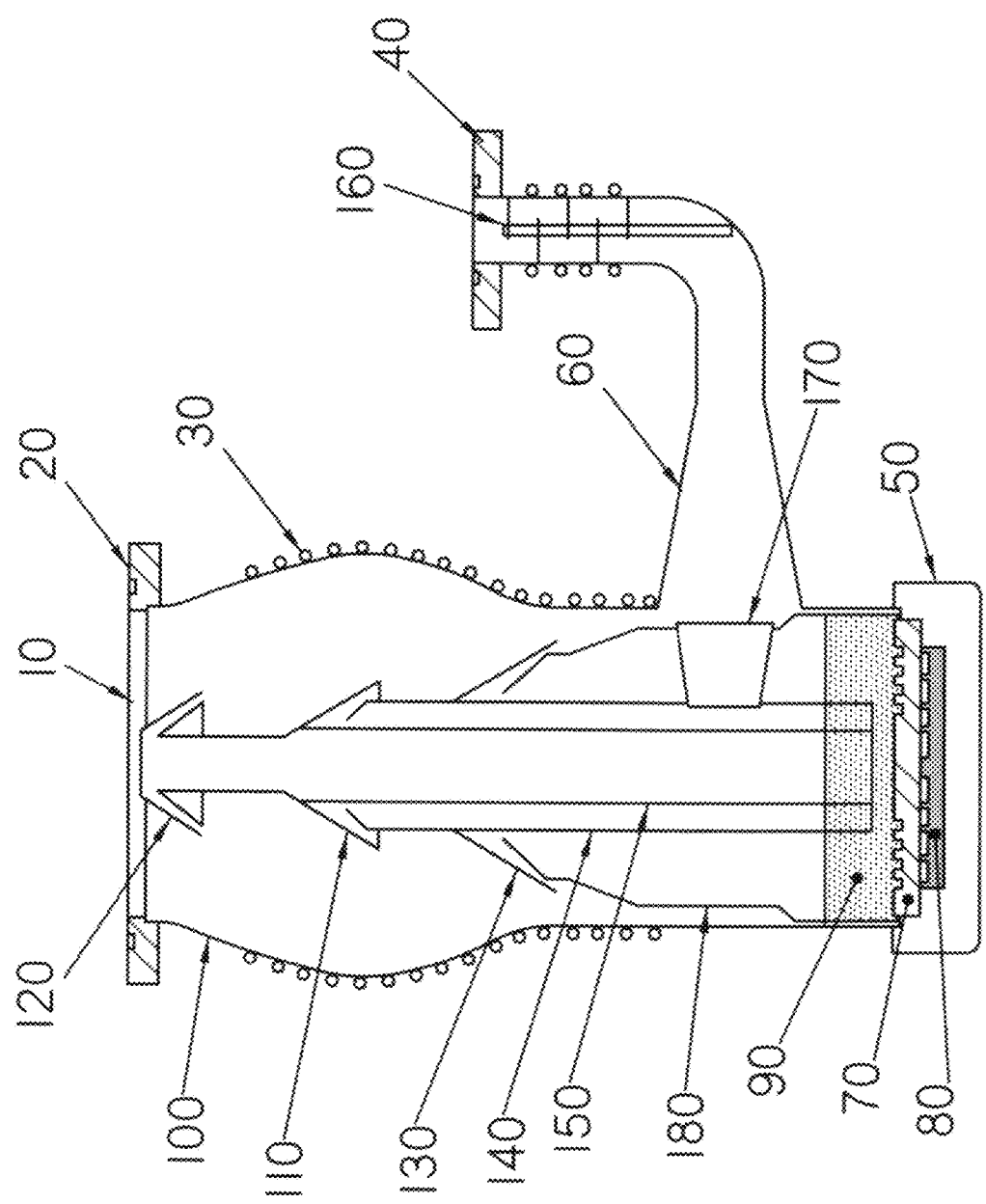
FIG. 1 is a diagram of cutaway view of a typical commercially available oil diffusion vacuum pump.

According to Hablanian, the word vacuum can describe a very wide range of conditions, with nearly complete emptiness at one extreme, while at the other extreme, vacuum can be described as any air or gas pressure less than a prevailing pressure in an environment or, specifically, any pressure lower than the atmospheric pressure. An example of vacuum can be described as a nearly perfect vacuum such as intergalactic space or the much higher pressures existing at the inlet of an ordinary vacuum cleaner or in a straw used for drinking. To be able to quantify a vacuum, one has to consider the density of the gas within a vacuum chamber or vacuum pump. The degree of vacuum can easily be described in terms of gas particle density instead of pressure. Scientific and engineering interest in vacuum spans fifteen orders of magnitude of gas densities. For most scientific research, the greatest amount of vacuum level is desired, but there are practical considerations to consider. Since research is something that is funded and has a finite supply of money, a compromise will be required between cost and desired ultimate vacuum level. Instead of a very large turbomolecular pump, a series of inexpensive oil diffusion pumps might be needed to create a vacuum, or as the case may be, a single very large diffusion pump. In the early molecular beam studies performed by the late Nobel Laureate Dr. John B. Fenn at Yale, oil diffusion pumps were used that had an opening of well over three feet. It was one of the co-inventors in this application (Joseph Bango Jr.) who routinely performed maintenance on the vacuum chamber above the large oil diffusion pumps that Dr. Fenn used in his beam research. The use of oil diffusion vacuum pumps solves one problem, but unfortunately causes another. The problem of using oil diffusion vacuum pumps is that they routinely cause the undesired effect of backstreaming and contaminate the vacuum chamber along with whatever is inside it. In most work requiring the use of a high vacuum in research or an industrial process (the semiconductor industry), it only takes a monolayer of oil to ruin the work.

Hablanian states that "the presence of the oil in the pump produces the possibility of migration or back-streaming into the vacuum chamber. Many high-vacuum applications are extremely sensitive to the presence of even minute amounts of hydrocarbon contamination. Examples of these are surface study instruments and various microcircuit fabrication processes. Backstreaming becomes significant in typical high-vacuum installations whenever inlet pressures of less than 0.5 Torr are reached. At this pressure, molecular or transition flow conditions are reached in pipes or ducts a few centimeters in diameter (and a few meters long). In the molecular flow range the oil molecules are free to flow in the upstream direction because they do not collide with pumped gas molecules. The rate of backstreaming at the vacuum chamber depends on pump design, the oil used, the dimensions of the inlet ducts (the longer and narrower, the better, but consider concomitant loss of pumping speed), and the pump and duct temperatures. However, the rate is usually high enough that the variation of a factor of 10 due to the foregoing conditions does not represent a satisfactory range for a selection. Typical measurements indicate backstreaming rates that correspond to oil film deposition at the rate of one monolayer per second (ca. $10^{-5}$ g/cm$^2$ min)."

One can easily see that although oil diffusion pumps and turbomolecular pumps may work in some applications, they are at best a compromise. What is needed is a better high vacuum pump. The disclosed invention is an "oil-less" diffusion pump, where the need for oil and a heating mechanism are replaced with a simple electrospray source. As mentioned earlier, for a variety of reasons, there has recently been a growing interest in the possibility of using very small satellites and probes for some space missions. This interest in "miniaturization" has triggered a rebirth of research on "colloidal propulsion", the production of thrust by electrostatic acceleration of highly charged droplets of non-volatile liquids. Such use of charged droplets as propellants has its roots in the studies carried out during World War I by John Zeleny, a physicist at Yale. Zeleny found that if a small-bore thin-walled tube was maintained at a high potential (e.g. one or more kV) relative to its surroundings or an opposing electrode, the electric field at the tube tip could be sufficiently intense to disperse an emerging conducting liquid into the ambient gas (air) as a fine spray of charged droplets. Except for an occasional paper, this "electrospray" phenomena remained pretty much a laboratory curiosity until the 1960's when two new possible applications emerged. First came the realization that non-volatile liquids could be electrosprayed into vacuum. Thus, electrostatic acceleration of the charged droplets to high velocities is emerging as a useful technology for vehicle propulsion in space. Earlier studies on the development of "ion engines" based on the acceleration of atomic ions had shown that very high specific impulses could indeed be achieved; however, more attractive ratios of thrust to power could be obtained with "ions" having much higher mass to charge ratios than ionized atoms could provide. The second and intriguing possible application for Zeleny's charged droplets were proposed in 1968 by Malcolm Dole. Zeleny had noticed that if the liquid was volatile, evaporation would shrink each droplet until at some point it would become unstable and suddenly disintegrate into a plurality of smaller "offspring" droplets. Zeleny realized that the reason for such disintegration was the shrinking of the droplet due to evaporation of solvent. The consequent increase in charge density led to an increase in Coulomb repulsion forces that finally over-came the surface tension that held the droplet together so it disintegrated into smaller droplets. This instability caused by excess droplet charge had been predicted and characterized by Rayleigh back in 1882 and now bears his name. Zeleny's droplets were dispersed in air that provided the enthalpy necessary to vaporize the droplet solvent. When dispersion takes place in vacuum, the only immediately available enthalpy is the "sensible heat" of the droplet's substance. Evaporation of some of the solvent quickly decreases the temperature to values so low that vaporization ceases and only partial evaporation can occur. Dole reasoned that each of the offspring droplets resulting from the Rayleigh instability would repeat the evaporation-disruption sequence. If the electrosprayed liquid comprised a dilute solution of large polymer molecules in a volatile solvent this evaporation disruption sequence should ultimately produce droplets so small that each one would contain only a single polymer molecule. As the last of the solvent evaporated, the molecule would retain some of its droplet's charge and thus form an intact gaseous ion from a species much too large and fragile to be vaporized for ionization by traditional methods such as by Electron Impact (EI) or Laser Photons. Dole hoped that analysis of the resulting ions with a mass spectrometer would provide a route to the long sought goal of determining molecular weight distributions in synthetic polymers. Unfortunately, for a number of reasons, Dole's attempts to reduce this idea to experimental practice were not sufficiently successful to persuade others to repeat or continue them. Then, in the 1980's, Dr. John Fenn and his colleagues at Yale first reported that Dole's idea worked very well with small solute molecules. Subsequently Fenn showed that if certain precautions were observed, the Dole approach could indeed produce intact ions from almost any polar molecule, no matter how large. Thus began what is now known as Electrospray Ionization Mass Spectrometry (ESIMS), a technique that has revolutionized the analysis of the large and fragile molecules that play such a vital role in living systems. In 2009, the number of papers per year based on this technique is believed to have totaled over 6,000 and is still climbing. The world population of ESIMS instruments is now over 20,000 and growing. It is noteworthy that in spite of the effectiveness and widespread use of ESIMS, the mechanism by which it converts solute species into ions during evaporation of charged droplets remains a subject of much argument and debate.

Microscopic examination of a stable electrospray reveals that the liquid emerging from the tip of the spray tube or needle forms a conical meniscus known as a so-called "Taylor cone" in honor of G. I. Taylor whose theoretical analysis first calculated the exact conical shape. In addition to the conical shape of the liquid, a fine filament or jet of liquid emerges from the cone tip and breaks up into nearly mono-disperse droplets whose initial diameters are slightly larger than the diameter of the jet. Sprays produced under these circumstances are sometimes referred to as "cone-jet sprays." It turns out that to obtain a stable cone-jet spray one must achieve and maintain a fairly delicate balance between flow rate and applied field. Moreover that optimum balance depends very strongly on the properties of the liquid, in particular its electrical conductivity and its surface tension. In general, the higher the conductivity and surface tension, the lower the flow rate must be.

Introduction of liquid at a desired rate is usually achieved either by a positive displacement pump or by pressurizing a source reservoir of the sample liquid with gas. The liquid flows through a conduit long enough and narrow enough to require a high-pressure difference between the source and the exit of the spray needle to maintain the flow. Thus, a stable steady flow can usually be maintained for a particular liquid by an appropriate combination of diameter and length for the tube and reservoir pressure for the gas. In the case of a positive displacement pump, of course, the liquid flow rate can be maintained at any value for which flow rate and liquid properties are consistent with stability, but one has to know what flow rate to prescribe for the pump. If the liquid flow rate is above the rate at which the electric field can extract liquid from the tip of the Taylor cone, excess liquid accumulates at the cone base and periodically departs as a large droplet that depletes the cone liquid and temporarily stops the spray until the cone receives enough new liquid to re-establish the spray. If the flow rate remains too high than this type of interruption recurs at a frequency that depends upon the flow rate of the liquid and the size of the cone, i.e. the diameter of the source tube. On the other hand, if the flow rate at which liquid is supplied is too small, the electric field extracts liquid from the tip of the Taylor cone faster than new liquid comes into the base. In that case the cone liquid is depleted and the spray stops until enough new liquid accumulates to start again.

In lieu of a positive liquid displacement pump, a passive feed system offers promise of overcoming many of the control problems that might otherwise be encountered in a recirculating fluid for a stable electrospray. The idea is to use capillarity-driven flow rather than hydrostatic pressure or a mechanical pump to supply liquid to the electrospray. A key characteristic of flow driven by capillary forces is that those forces can move the liquid only to the extremity of the capillarity element. Thus, for example, if a wick comprising a strip of filter paper or cloth is suspended with one end dipping beneath the surface of water in a beaker, water will migrate through the wick, driven by capillarity. If the wick is jacketed or the ambient gas is saturated with water vapor so there is no evaporative loss of water from the wick, then the capillarity driven flow will cease when the wick becomes saturated with liquid, i.e. is wet throughout its length. If the surrounding gas is not saturated with water vapor then water will be lost from the wick by evaporation, and the capillarity flow of water up the wick will continue at a rate just sufficient to compensate for the evaporative loss and the wick will remain saturated with liquid. If the wick is long enough to reach over the rim of the beaker and hang down the outside so that its end is at or below the surface level of the water in the beaker, then water will drip from the end of the wick and capillarity driven flow will continue from the beaker water through the wick until the beaker water is depleted to the level at which it loses contact with the wick. In short, in a wick that is in contact with a source of liquid, capillarity can maintain flow from the source through the wick at a rate just sufficient to compensate for any loss of liquid from the wick. That capillarity driven flow will cease when there is no longer any loss of liquid from the wick or when the wick loses contact with the source liquid, whichever comes first. Familiar examples in which this self-balancing feature of wick flow works to great advantage include candles and oil lamps. In those devices, the flame that provides the illumination at once consumes the liquid fuel evaporating from the wick and supplies the heat required to maintain that evaporation. For a contemporary oil based diffusion pump, the heated oil forms a vapor, which has a specific molecular velocity, and will recondense to a liquid once it makes contact with the cooled walls of the diffusion pump. By utilizing a wick, a capillarity based recirculation system can be realized. Fenn discloses using a wick feed system for electrosprays as a process for introducing an analyte into a mass spectrometer, in U.S. Pat. No. 6,297,499.

FIG. 1 details a typical commercially available oil diffusion vacuum pump. The top of the diffusion pump 10 is the inlet to the diffusion pump and contains an opening that connects to the vacuum chamber by a flange 20 that usually houses an o-ring or some similar seal. The main body of the oil diffusion pump 100 is surrounded by a coil of hollow tube 30 through which water flows and cools the metal walls of the diffusion pump to allow for the heated oil vapor to cool and condense on the walls of the inside of the diffusion pump. The outlet (foreline) of the diffusion pump 40 is connected by a flange to a mechanical vacuum pump. A baffle 160 is placed in the outlet section 60 of the diffusion pump. For normal operation of the diffusion pump, an oil reservoir 90 is heated by a heating element 80 that is connected to a finned metal boiler plate 70. A cover plate 50 surrounds the heating element 80 and prevents direct contact with external surfaces. As the oil reservoir 90 is heated, at a certain specific temperature, the oil surface is converted to an energetic vapor that will travel upward through the internal tubes called fractional tubes. There are three fractional tubes, with is a central inner fractional tube 150, an inner surrounding fractional tube 140, and an outermost surrounding fractional tube 180. An ejector stage 170 provides for a higher tolerable forepressure from the mechanical pump. The fractional tubes 140 150 180 are capped off by angled jet assemblies that cause the heated vapor to be forced in a downward curtain in a direction toward the walls of the diffusion pump. As the heated vapor contacts the inner "water cooled" walls of the diffusion pump, the vapor is condensed back into a liquid. Each of the three fractional tubes are capped off with a angled jet assembly. The central inner fractional tube 150 is capped off with its own angled jet assembly 120. The inner surrounding fractional tube 140 is capped off with its own angled jet assembly 110, and the outermost surrounding fractional tube 180 is capped off with its own angled jet assembly 130. The reason there are three individual fractional tubes with individual angled jet assemblies is that each one provides an additional degree of compression. With the three individual fractional tubes and angled jet assemblies, there are three individual compression stages to provide for a greater ultimate vacuum. The angled foreline pipe 60 causes an additional fourth compression stage.

Figure 2:
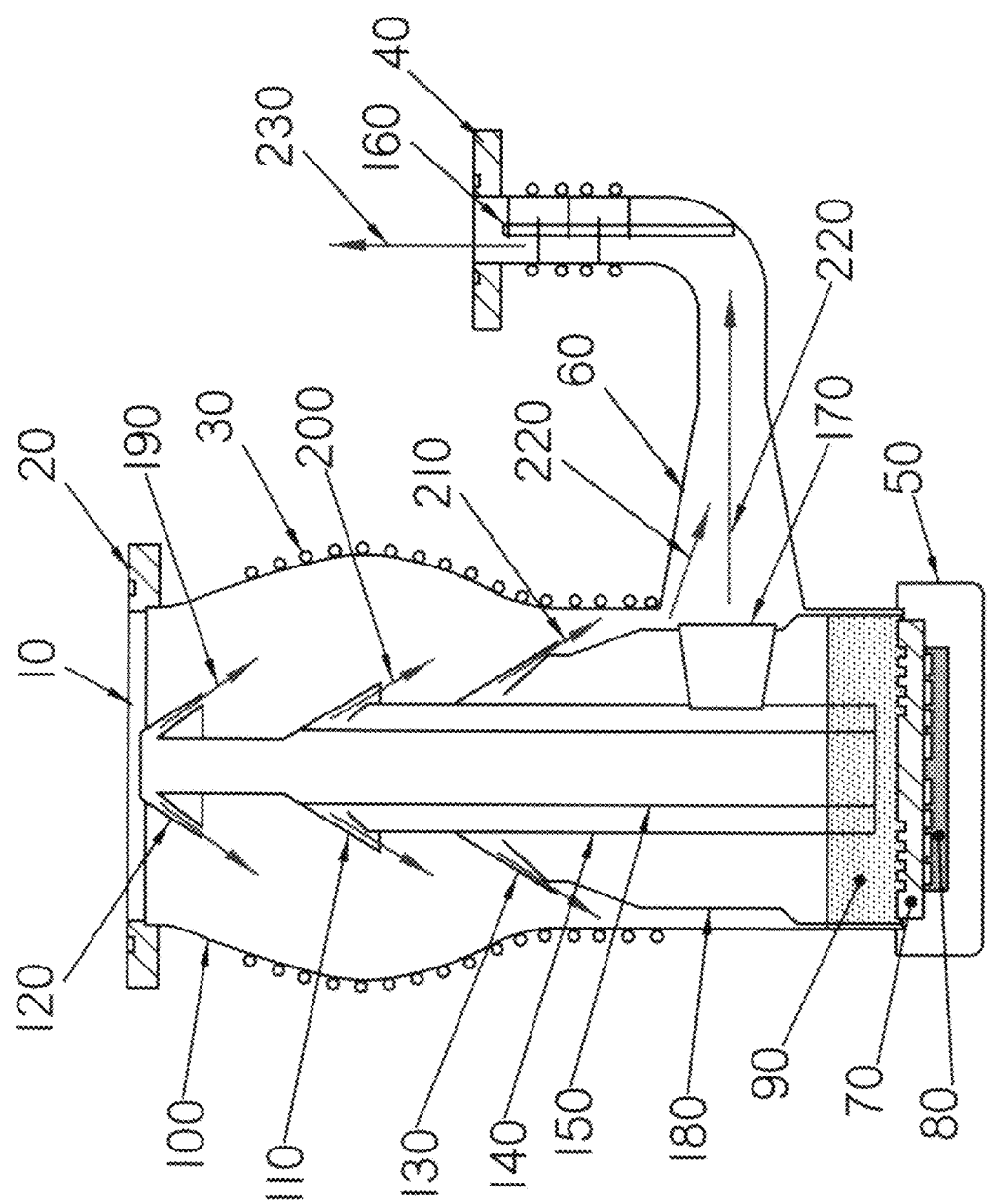
FIG. 2 is a diagram of cutaway view of a typical commercially available oil diffusion vacuum pump including the direction of oil vapor.

FIG. 2 details a typical commercially available oil diffusion vacuum pump showing how the oil vapor flows through the diffusion pump. The top of the diffusion pump 10 is the inlet to the diffusion pump and contains an opening that connects to the vacuum chamber by a flange 20 that usually houses an o-ring or some similar seal. The main body of the oil diffusion pump 100 is surrounded by a coil of hollow tube 30 through which water flows and cools the metal walls of the diffusion pump to allow for the heated oil vapor to cool and condense on the walls of the inside of the diffusion pump. The outlet (foreline) of the diffusion pump 40 is connected by a flange to a mechanical vacuum pump. A baffle 160 is placed in the outlet section 60 of the diffusion pump. For normal operation of the diffusion pump, an oil reservoir 90 is heated by a heating element 80 that is connected to a finned metal boiler plate 70. A cover plate 50 surrounds the heating element 80 and prevents direct contact with external surfaces. As the oil reservoir 90 is heated, at a certain specific temperature, the oil surface is converted to an energetic vapor that will travel upward through the internal tubes called fractional tubes. There are three fractional tubes, with is a central inner fractional tube 150, an inner surrounding fractional tube 140, and an outermost surrounding fractional tube 180. An ejector stage 170 provides for a higher tolerable forepressure from the mechanical pump. The fractional tubes 140 150 180 are capped off by angled jet assemblies that cause the heated vapor to be forced in a downward curtain in a direction toward the walls of the diffusion pump. As the heated vapor contacts the inner "water cooled" walls of the diffusion pump, the vapor is condensed back into a liquid. Each of the three fractional tubes are capped off with a angled jet assembly. The central inner fractional tube 150 is capped off with its own angled jet assembly 120 causing the heated oil vapor to be ejected outward at a downward angle 190. The inner surrounding fractional tube 140 is capped off with its own angled jet assembly 110 causing the heated oil vapor to be ejected outward at a downward angle 200 and the outermost surrounding fractional tube 180 is capped off with its own angled jet assembly 130 causing the heated oil vapor to be ejected outward at a downward angle 210. The reason there are three individual fractional tubes with individual angled jet assemblies is that each one provides an additional degree of compression. With the three individual fractional tubes and angled jet assemblies, there are three individual compression stages to provide for a greater ultimate vacuum. The angled foreline pipe 60 causes an additional fourth compression stage which causes an additional amount of compression of the trapped gas released from the 220 heated oil vapor, which is ultimately forced out through the exit of the foreline tube 230 and ultimately into the mechanical vacuum pump.

The basic operation of an oil diffusion pump or vapor jet pump is momentum transfer between a heavy high-speed vapor molecule with a smaller gas molecule. The gas molecules get trapped in the vapor jet and are pulled through the diffusion pump. To get the oil into the vapor stage, the oil reservoir is heated to its boiling point in a reduced pressure atmosphere. A "rough" vacuum must exist in the diffusion pump before the diffusion pump heater is switched on because no pumping will occur at atmospheric pressure and damage to the oil may occur. Once the proper conditions are met within the diffusion pump, the surface of the heated oil produces a vapor that is directed up through the fractional tubes and redirected downward through the angled jet assemblies. The jets form a molecular curtain that encounters randomly moving gas molecules (molecular flow conditions) that can now be directed downward from the uppermost angled jet assembly, to the next lower angled jet assembly, and down to the lowest angled jet assembly, eventually pulled out through the foreline exit to the mechanical pump and finally exhausted into the atmosphere. As the vapor contacts the water "cooled walls" of the diffusion pump, it condenses back into a liquid and drips back down into the oil reservoir, only to be returned back into vapor. Under normal operating conditions, the diffusion pump works similarly to other compression pumps that develop relatively high exhaust pressures compared to the inlet pressure. Numerous experiments performed by the inventors and others have clearly shown that with wick injectors, both total current in the spray and selected ion currents at the detector of both a mass spectrometer and a colloidal thruster are remarkably steady even with liquids having high conductivity's and/or high surface tensions. When gas pressure or a pump is used to supply liquid at very low flow rates it can be very difficult to obtain and maintain the flow rate required for a stable spray. The disclosed invention preferably employs porous wicks in a recirculation mode in the electrospray diffusion pump.

Figure 3:
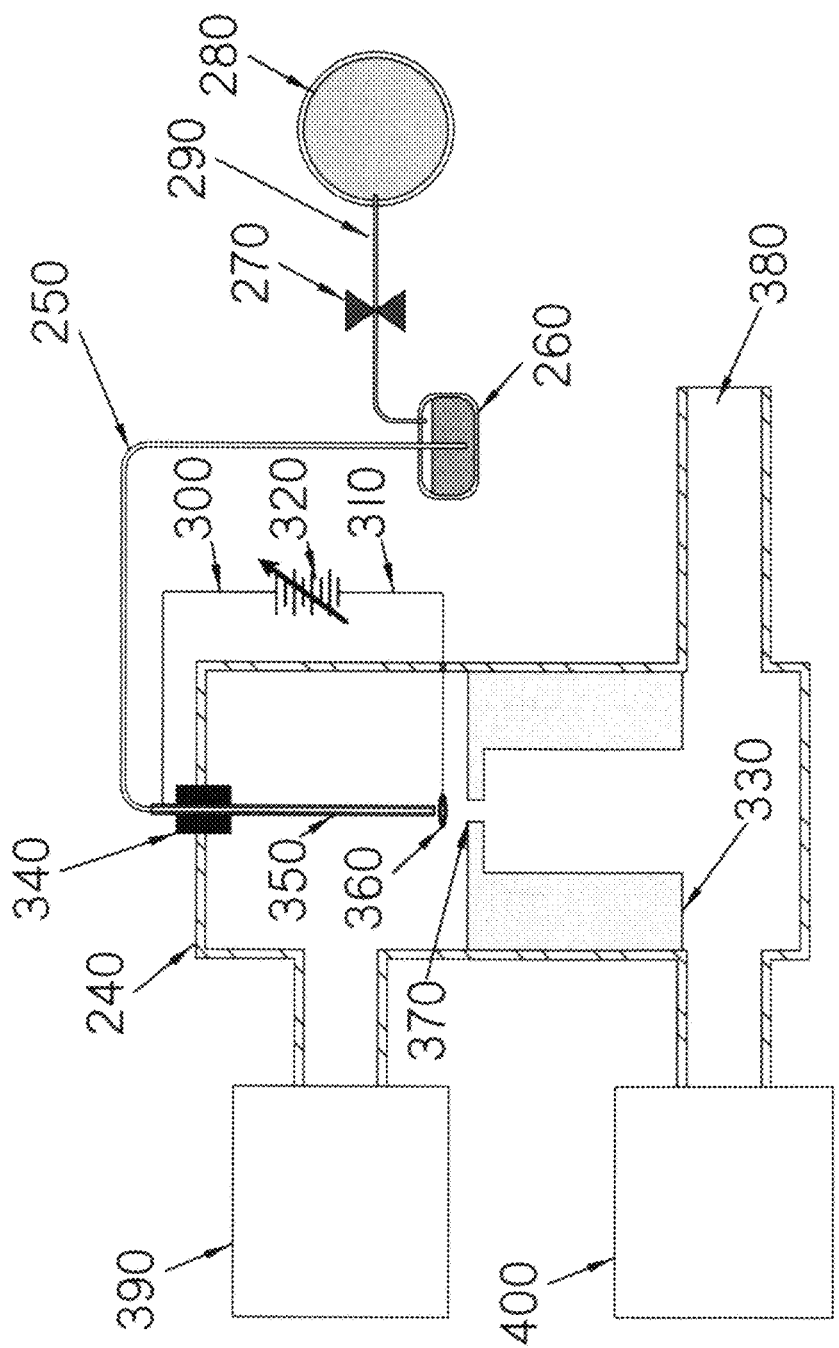
FIG. 3 is a schematic diagram of the proposed electrospray based diffusion vacuum pump.

FIG. 3 details the electrospray diffusion pump that obviates the need for heating to create a vapor. In a traditional oil based diffusion pump, the oil reservoir must be heated to allow for the oil vapor to gain thermal energy to attain molecular speeds on par with the gas molecules. In the preferred embodiment of the disclosed invention, the velocity of the pumping fluid would not be a result of heating, but of electrospray. Connecticut Analytical has performed tests on a small vacuum test chamber utilizing electrospray as a pumping fluid. The main housing of the test vacuum chamber 240 contains the electrospray needle 350 that is essentially a hollow tube. The electrospray needle 350 may itself be conductive to allow the electrospray pumping fluid to attain a high voltage, or the electrospray needle may be non-conductive and the high voltage can be held in direct contact with the electrospray fluid—either way, the conductive electrospray fluid will function to produce a Taylor cone and produce a jet of electrospray droplets necessary for pumping to occur. To measure the pressure differential of the pumping action by electrospray, the vacuum test chamber utilized in prior experiments had two separate but identical miniature ionization type vacuum gauges. One miniature ionization type vacuum gauge 390 was placed in the upper portion of the vacuum chamber (upstream) while a second miniature ionization type vacuum gauge 400 was placed in the lower portion of the vacuum test chamber (downstream). The vacuum test chamber is designed very similar to a conventional diffusion vacuum pump. There are basically two main zones or volumes: the upstream low pressure zone and the downstream high pressure zone connected to a roughing vacuum pump. The reason for placing two miniature ionization type vacuum gauges on the same vacuum test chamber is to measure a difference between the two pressures over time to determine how much pumping is occurring. During normal operation of the electrospray diffusion pump, a mechanical, diaphragm, or other suitable foreline vacuum pump is connected to the lower exhaust port 380 of the vacuum test chamber 240 to vent any captured gasses. The electrospray process will occur when there is a high voltage differential between the conductive electrospray fluid within the conductive electrospray needle 350 and the extractor 360 that is held in close proximity to the electrospray needle exit aperture. Each zone or volume has an ionization gauge to accurately measure variations in pressure at any time. The two volumes are separated by a metallic cylinder 330 with a small aperture 370 in the center. Above the aperture and axially aligned to the hole 370 in the metallic plate the electrospray needle 350 is located. Since the electrospray needle is held at an electric potential suitable to create a Taylor Cone in the working fluid, an electrical insulator 340 was placed between the vacuum test chamber 240 and the electrospray needle 350. In initial tests, the aperture 370 in the metal cylinder 330 was used as an extractor instead of the extractor ring 360 to create an electrospray. It is obvious to those skilled in the art that if the electrospray needle 350 is held at a close enough distance to the aperture 370 in the metal cylinder 330, the electrospray process would occur just as if the electrospray needle 350 was held further away from the aperture 370 in the metal cylinder 330 while using an extractor ring 360 held in close proximity to the electrospray needle 350. To create a voltage potential difference between the electrospray needle 350 and either the extractor ring 360 or the aperture 370 in the metal cylinder 330, one side of a variable voltage source 320 is connected between the electrospray needle 350 via a conductive wire 300. The other side of the variable voltage source 320 is connected to the extractor ring 360 or the aperture 370 in the metal cylinder 330 by a conductive wire 310. For initial testing, the electrospray fluid was held in a small reservoir 260 that is connected to the electrospray needle 350 via a small tube 250. The electrospray fluid can be pushed through the tube 250 by either directly pushing the electrospray fluid from a syringe placed in a syringe pump, or it can be pushed through by utilizing an external pressure source. In the drawing shown, the electrospray fluid was pushed through the tube 250 by connecting an external pressurized gas contained within a tank 280 to a bleed valve 270 by a small tube 290. The electrospray process will occur whether the electrospray needle 350 is tied to the positive side of the high voltage source or the electrospray needle 350 is tied to the negative side of the high voltage source. The key point here is that there is a voltage potential difference between the electrospray needle 350 and either the extractor ring 360 or the aperture 370. As long as the electrospray needle 350 is tied to an opposing polarity as the extractor ring 360 or aperture 370, the electrospray process will work.

Figure 4:
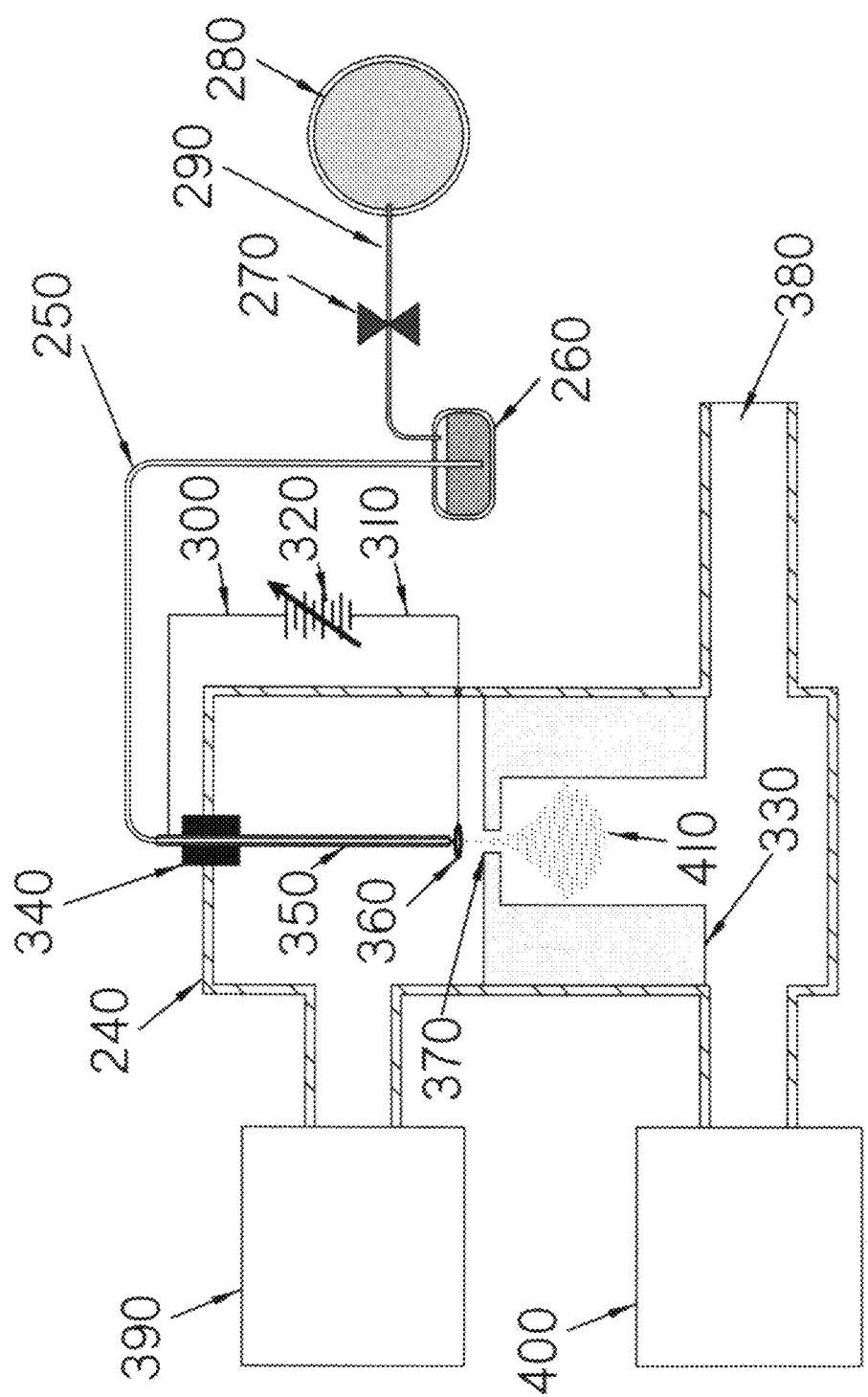
FIG. 4 is a schematic diagram of the proposed electrospray based diffusion vacuum pump showing the working electrospray.

FIG. 4 details the electrospray diffusion pump that obviates the need for heating to create a vapor. In a traditional oil based diffusion pump, the oil reservoir must be heated to allow for the oil vapor to gain thermal energy to attain molecular speeds on par with. the gas molecules. The main housing of the test vacuum chamber 240 contains the electrospray needle 350 that is essentially a hollow tube. The electrospray needle 350 may itself be conductive to allow the electrospray pumping fluid to attain a high voltage, or the electrospray needle may be non-conductive and the high voltage can be held in direct contact with the electrospray fluid—either way, the conductive electrospray fluid will function to produce a Taylor cone To measure the efficiency of the pumping action by electrospray.

The vacuum test chamber utilized two separate but identical miniature ionization type vacuum gages. One miniature ionization type vacuum gate 390 is placed in the upper portion of the vacuum test chamber (upstream) while a second miniature ionization type vacuum gauge 400 is shown placed in the lower portion of the vacuum test chamber (downstream). The vacuum test chamber is designed very similar to a conventional diffusion vacuum pump. There are basically two main zones or volumes: the upstream low pressure zone and the downstream high pressure zone connected to a roughing vacuum pump. The upper portion of the vacuum test chamber corresponds to the high vacuum section where any experiments or mass spectrometry applications would be done. The reason for placing two miniature ionization type vacuum gauges on the same vacuum test chamber is to measure a difference between the two pressures over time to determine how much pumping is occurring. During normal operation of the electrospray diffusion pump, a mechanical vacuum pump would be connected to the lower exhaust port 380 of the vacuum test chamber 240 to vent any captured gasses. The electrospray process will occur when there is a voltage differential between the conductive electrospray fluid within the conductive electrospray needle 350 and the extractor 360 that is held in close proximity to the electrospray needle exit aperture.

Each zone or volume in the electrospray diffusion pump of FIG. 4 has an ionization gauge to accurately measure variations in pressure at any time. The two volumes are separated by a metallic cylinder 330 with a small aperture 370 in the center. The electrospray needle 350 is located above the aperture and axially aligned to the hole 370 in the metallic plate. Since the electrospray needle is held at a high voltage potential, an electrical insulator 340 was placed between the vacuum test chamber 240 and the electrospray needle 350. In initial tests, the aperture 370 in the metal cylinder 330 was used as an extractor instead of the extractor ring 360 to create an electrospray.

If the electrospray needle 350 is held at a close enough distance to the aperture 370 in the metal cylinder 330, the electrospray process will occur just as if the electrospray needle 350 was held further away from the aperture 370 in the metal cylinder 330 while using an extractor ring 360 held in close proximity to the electrospray needle 350. To create a high voltage potential difference between the electrospray needle 350 and either the extractor ring 360 or the aperture 370 in the metal cylinder 330, one side of a variable high voltage source 320 is connected between the electrospray needle 350 via a conductive wire 300. The other side of the variable high voltage source 320 is connected to the extractor ring 360 or the aperture 370 in the metal cylinder 330 by a conductive wire 310.

For initial testing, the electrospray fluid was held in a small reservoir 260 that is connected to the electrospray needle 350 via a small tube 250. The electrospray fluid can be pushed through the tube 250 by either directly pushing the electrospray fluid from a syringe placed in a syringe pump, or it can be pushed through by utilizing an external pressure source. In the drawing shown, the electrospray fluid was pushed through the tube 250 by connecting an external pressurized gas contained within a tank 280 to a bleed valve 270 by a small tube 290. The electrospray process will occur whether the electrospray needle 350 is tied to the positive side of the voltage source or the electrospray needle 350 is tied to the negative side of the voltage source. The key point here is that there is a voltage potential difference between the electrospray needle 350 and either the extractor ring 360 or the aperture 370. As long as the electrospray needle 350 is tied to an opposing polarity as the extractor ring 360 or aperture 370, the electrospray process will work. When there is a voltage potential between the electrospray needle 350 and either the extractor ring 360 or the aperture 370 in the metal cylinder 330 is at a sufficient voltage to facilitate produce a Taylor cone and there is enough electrospray fluid within the electrospray needle 350, electrospray will occur. It should be noted that the metal cylinder 330 is held at a ground potential with the electrospray needle 350 held at a positive high voltage for initial experiments. In some applications, the applied voltage can range from several volts to tens of thousands of volts, with the value necessary being dependent on the application and empirical test results. The voltage applied is that which is necessary to form a Taylor Cone and thus create an electrospray jet.

Electric field strength follows an inverse square law. Therefore a specified physical quantity or strength is inversely proportional to the square of the distance from the source of that physical quantity. The greater the distance between the electrospray needle 350 or capillary tip and the extractor ring 360 or aperture 370 located in the metal cylinder 330, the higher the required voltage to form a Taylor Cone and produce an electrospray. A large gap may require several thousand volts or more whereas a very small gap may require only a few volts or less. The key parameter is the potential difference sufficient to produce a Taylor Cone.

It has been shown by the inventor's close work on micro-satellite propulsion with the late Dr. John Fenn, that the high voltage required to produce a Taylor Cone and subsequent electrospray, can operate properly if the polarity of high voltage is periodically switched. Therefore the electrospray process can start with a high voltage differential where the electrospray needle is tied to the positive side of the high voltage source while either the extractor ring or the aperture in the metal cylinder is tied to the negative side of the high voltage source and after a short time, the polarity of both are swapped, where the electrospray needle is now tied to the negative side of the high voltage source while either the extractor ring or the aperture in the metal cylinder is tied to the positive side of the high voltage source. This process can continue ad infinitum.

Dr. Fenn proposed the high voltage polarity swapping back in the early research with the inventors under the disclosed electrospray diffusion pump invention. When the proper voltage differential is attained, a Taylor cone will form, and a subsequent jet of droplets will result 410. It is this "plume" or cloud of electrosprayed droplets 410 that produces the pumping effect seen by the oil vapor in conventional vacuum diffusion pumps, albeit without the need for heating. Since there is no heating involved, the electrospray diffusion pump does not have the long startup time as required by conventional vacuum diffusion pumps, and without the heating, the power consumption of an electrospray vacuum diffusion pump is very low—in the milliwatts range. For the electrospray process to continue smoothly, the conductivity of the working electrospray fluid will dictate both the final droplet size and the velocity of the droplet. In a conventional oil diffusion pump, the vapor-jet or spray "curtain" must be dense enough so that the capture and trajectory change of incident air molecules transpires but not so dense that incident air molecules or background gases bounce off the spray curtain.

As indicated earlier, during previous research with electrosprays at atmospheric pressure, we noted that electrosprays can create a convection current. There have been instances where one can actually watch smoke being drawn into an electrospray jet. Based on prior experience and theoretical analysis which follows, we know we will have gaseous compression and pumping. The question is quantification of the pumping capability and the process to be used to optimize it. In past colloidal space propulsion research, the goal was to maximize the conductivity of the propellant fluid to achieve high velocities. In this application, a dielectric pump oil miscible with an ionic liquids used for propulsion as a conductivity "enhancer" was used. The reduction in conductivity slows down or moderates the velocity of the electrospray droplets such that we maximize the probability of collisions with the incident background gas we wish to pump. The mixture must be optimized for the high thermal energies of hydrogen down to that of air, so that all these gases can be pumped effectively. The vacuum test chamber initially used was a simple, off the shelf, multi-port vacuum connector. Initial testing was done using a single electrospray needle in a tube that is connected to a foreline pump (mechanical or diaphragm). The forepump was connected to a gate valve that allowed it to be isolated from the vacuum test chamber. Although only a single electrospray needle was used in initial testing, the preferred embodiment would have to have multiple electrospray emitters to produce a greater pumping action. Initially, the electrospray needle was positively charged and was wick fed from a small fluid reservoir, with the electrospray plume expanding out to the wall of the tube. The tube was initially held at ground potential. The vacuum test chamber was closed off to minimize the background gas volume, but had a calibrated leak valve attached so the gas load to the electrospray pump could be varied.

While discussing the electrospray pump concept with co-inventor Paulo Lozano, and MIT Professor Manuel Martinez-Sanchez, the a question was whether small droplets as opposed to ions of a high enough velocity to overcome the thermal velocity should be used to pump the gas out of the vacuum chamber. In addition, the mean-free-path ($\lambda$) of our electrospray droplets should be tailored to have a high probability of collision with the background gas molecules. The critical performance parameter for a pump based on the ejector effect (collisional dragging of the residual gas molecules by the electrospray droplets) is the mean free path $\lambda_n$ for a neutral molecule colliding with all the droplets. If the cross-section of one droplet is $\sigma_d$ and the number density of droplets is $n_d$, we have $$\lambda_n = \frac{1}{n_d \sigma_d} \quad (1)$$

This mean free path should be of the same order as the diameter of the chamber. If it were much less, gas molecules would not penetrate the electrospray jet, and if it were much more, they would go through it with little effect. The density $n_d$ can be calculated from knowledge of the overall volumetric flow rate Q of the spray, its cross-sectional area A, its mean speed $v_d$ and droplet radius $R_d$:

$$n_d = \frac{Q/A}{\frac{4}{3}\pi R_d^3 v_d} \quad (2)$$

In turn, these quantities can be related to fundamental properties of the electrospray. The velocity $v_d$ depends on the extraction voltage V and the charge per unit mass, q/m, of the droplets:

$$v_d = \sqrt{2\frac{q}{m}V} \quad (3)$$

The droplet charge is typically of the order of one half the Rayleigh limit for Coulombic explosion, which depends on the droplet radius $R_d$:

$$q = 4\pi\sqrt{\varepsilon_0 \gamma} R_d^{3/2} \quad (4)$$

The radius $R_d$ is known to be of the order of the characteristic jet radius at the tip of the Taylor cone, which, as defined by de la Mora, is $$r^* = \left(\varepsilon\varepsilon_0 \frac{Q_1}{K}\right)^{1/3} \quad (5)$$

Here $Q_1$ is the flow rate per emitter, K is the electrical conductivity of the liquid and $\in$ is its dielectric constant. Empirically a good representation of the drop radius is $$R_d = 0.28 r^* \quad (6)$$

The connection of $Q_1$ to Q depends on the emitter arrangement chosen. We assume a square array of emitters, spaced d from each other, such that $$Q_1 = \frac{d^2}{A} Q \quad (7)$$

Finally, the unit flow $Q_1$ must be between certain limits imposed by the jet dynamics. On the high side, the limitation is the onset of violent jet whipping, which occurs when the non-dimensional flow rate $$\eta = \left(\frac{\rho K Q_1}{\gamma \varepsilon \varepsilon_0}\right)^{1/2} \quad (8)$$

exceeds about 4. Here $\rho$ is the liquid density and $\gamma$ is its surface tension. We will choose $Q_1$ such as to obtain a desired value of $\eta$, namely, $$Q_1 = \frac{\gamma \varepsilon \varepsilon_0 \eta^2}{\rho K} \quad (9)$$

Combining Eqs. (1) through (9), we can finally express the gas molecule mean free path in terms of fluid properties and quantities that can be selected by the designer:

$$\lambda_n = 2.38 \frac{V^{1/2} d^2 K^{5/6} \rho^{5/12}}{\varepsilon_0^{7/12} \varepsilon^{5/6} \lambda^{2/3} \eta^{11/6}} \quad (10)$$

An important observation is that low conductivity favors shorter mean free paths. This is a powerful design knob, since K can vary over many orders of magnitude by proper choice of doping level, and values as low as $10^{-6}$ Si/m are reasonable with no special precautions. Lower values may be difficult due to contaminants in the solvent.

Figure 5:
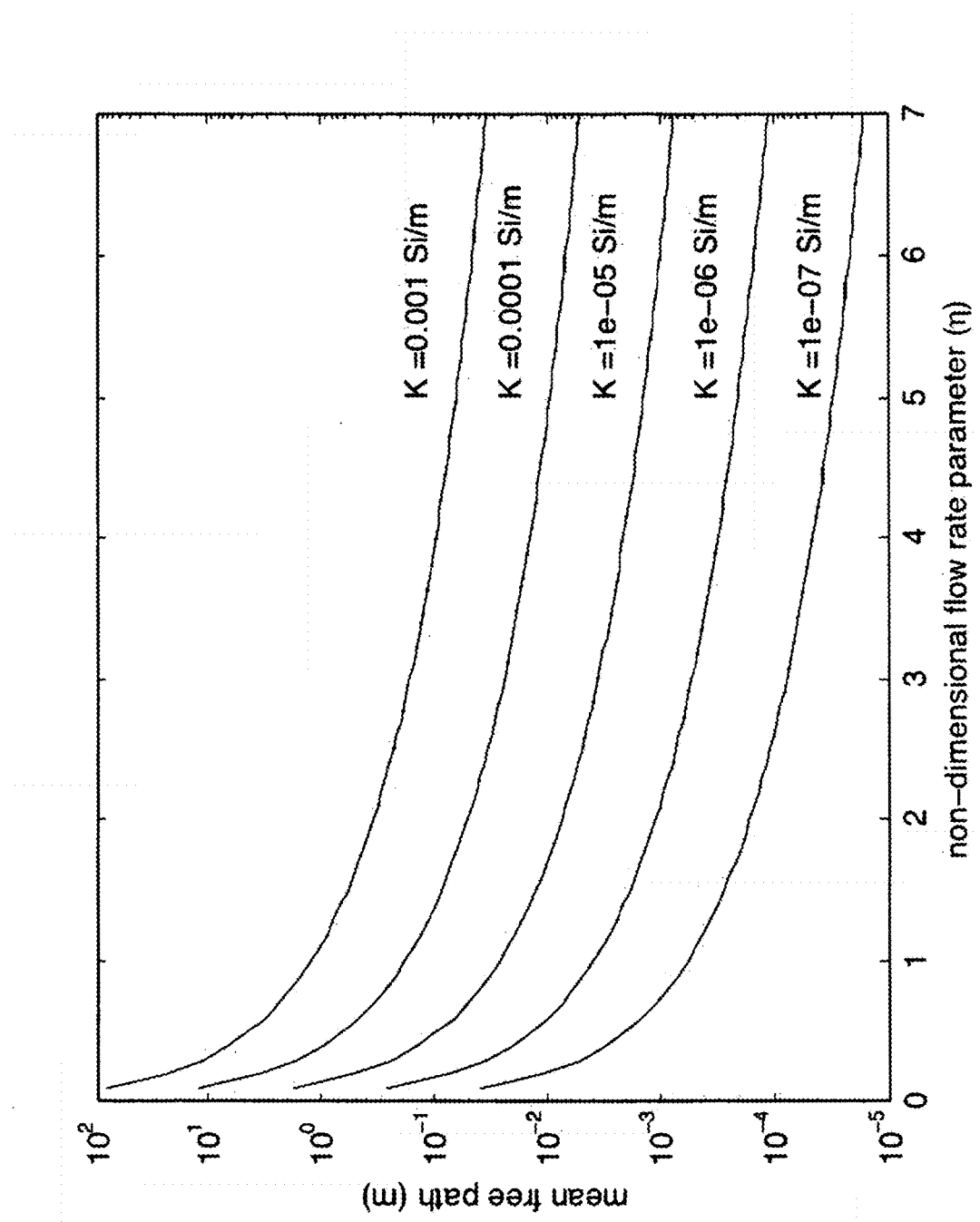
FIG. 5 shows a graph that illustrates the dependence of the mean free path on flow rate based upon the conductivity of the electrospray fluid.

FIG. 5 illustrates graphically the dependence of mean free path from Eq. (10) on flow rate through the parameter defined in Eq. (8) and the liquid conductivity for a liquid of unit specific gravity, an applied voltage of 2000 V, emitter spacing of 0.5 mm, surface tension of 0.05 N/m and dielectric constant of 50. These results suggest the pumping concept is valid from the collisional standpoint provided the conductivity of the fluid remains in the range $10^{-5}$-$10^{-3}$ Si/m. This fact negates the use of ionic liquids for this application, at least in the droplet regime, as the conductivities, even for liquids with the highest viscosities, are in general much higher. An option is to use the same type of pumping oil currently used in regular diffusion pumps. Their vapor pressure at room temperature of some of these pumping liquids can be as low as $10^{-10}$ Torr, with electric conductivities as low as $10^{-11}$ Si/m. A key element in this research is to determine if such liquids, plus other organic solvents with very low vapor pressure, can be effectively electrosprayed with a passive wick feed at flow rates corresponding to $\eta \geq 2$.

In testing the concept of utilizing an electrospray source to produce a vacuum diffusion pump, it was noted that a single spray would not be sufficient, and would require multiple sprays. Multiple sprays may be produced from a paper or polymer emitter "cup" where the edges have been trimmed to have many sharp points. Fluid wicking on this surface will migrate to the sharp tips were upon application of a suitable electric field, electrosprays will be formed at the tips and a spray plume of fine droplets will emerge and be accelerated to the oppositely charged pump chamber wall (John Fenn proved this ES emitter concept in the past and it is mentioned in his patent for wick sources for mass spectrometers, U.S. Pat. No. 6,297,499). If this wall were coated with a wicking paper or polymer, the pump fluid would be soaked up and recycled through a wick "stalk" with in turn feeds the emitter "cup" again. Multiple emitter "cups" can provide additional pumping stages. This concept provides for simplicity, reliability, and axis insensitivity if a wicking material were added to the wall.

FIG. 6 details the electrospray diffusion pump as described in FIG. 4 with the difference being that the electrospray fluid reservoir is no longer located external to the pump, but inside the pump. The main housing of the test vacuum chamber 240 contains the electrospray needle 350 that is essentially a hollow tube. The electrospray reservoir 260 is attached to the electrospray needle 350. The electrospray needle 350 may itself be conductive to allow the electrospray pumping fluid to attain a high voltage, or the electrospray needle may be non-conductive and the high voltage can be held in direct contact with the electrospray fluid—either way, the conductive electrospray fluid will function to produce a Taylor cone and produce a jet of electrospray droplets necessary for pumping to occur. To measure the efficiency of the pumping action by electrospray, the vacuum test chamber utilized two separate but identical miniature ionization type vacuum gauges. One miniature ionization type vacuum gauge 390 is placed in the upper portion of the vacuum chamber (upstream) while a second miniature ionization type vacuum gauge 400 was placed in the lower portion of the vacuum test chamber (downstream). The vacuum test chamber is designed very similar to a conventional diffusion vacuum pump. There are basically two main zones or volumes: the upstream low pressure zone and the downstream high pressure zone connected to a roughing vacuum pump. The reason for placing two miniature ionization type vacuum gauges on the same vacuum test chamber is to measure a difference between the two pressures over time to determine how much pumping is occurring. During normal operation of the electrospray diffusion pump, a mechanical vacuum pump would be connected to the lower exhaust port 380 of the vacuum test chamber 240 to vent any captured gasses. The electrospray process will occur when there is a voltage differential between the conductive electrospray fluid within the conductive electrospray needle 350 and the extractor 360 that is held in close proximity to the electrospray needle exit aperture. Each zone or volume has an ionization gauge to accurately measure variations in pressure at any time. The two volumes are separated by a metallic cylinder 330 with a small aperture 370 in the center. The electrospray needle 350 is located above the aperture and axially aligned to the hole 370 in the metallic plate. If the electrospray needle 350 is not axially aligned with the aperture 370, the electrospray needle 350 will work—albeit with much less efficiency. In the preferred embodiment of the disclosed electrospray diffusion pump, the electrospray needle 350 will be axially aligned with the aperture 370. Since the electrospray needle is held at a high voltage potential, an electrical insulator 340 was placed between the vacuum test chamber 240 and the conductive wire 300 attached to the electrospray needle 350. In initial tests, the aperture 370 in the metal cylinder 330 was used as an extractor instead of the extractor ring 360 to create an electrospray. If the electrospray needle 350 is held at a close enough distance to the aperture 370 in the metal cylinder 330, the electrospray process will occur just as if the electrospray needle 350 was held further away from the aperture 370 in the metal cylinder 330 while using an extractor ring 360 held in close proximity to the electrospray needle 350. To create a high voltage potential difference between the electrospray needle 350 and either the extractor ring 360 or the aperture 370 in the metal cylinder 330, one side of a variable high voltage source 320 is connected between the electrospray needle 350 via a conductive wire 300. The other side of the variable high voltage source 320 is connected to the extractor ring 360 or the aperture 370 in the metal cylinder 330 by a conductive wire 310. For initial testing, the electrospray fluid was held in a small reservoir 260 that is connected to the electrospray needle 350 directly. The electrospray fluid is wicked through the porous membrane 420 that is contained within the electrospray needle 350 by capillary action. It is obvious to those skilled in the art that the electrospray fluid can be pushed through the electrospray needle 350 if the electrospray fluid reservoir were 260 sealed and a small amount of pressurized gas were added to the sealed electrospray fluid reservoir 260. The electrospray diffusion pump can be constructed to run as a one time only single use vacuum pump for short duration tasks, or it can be configured with a large internal electrospray fluid reservoir that can be continually recirculated by adding wicking material to the walls of the inside of the electrospray diffusion pump.

FIG. 7 details the electrospray section of the electrospray diffusion pump that was used in the actual testing. The main housing of the vacuum test chamber contains the electrospray needle 350 that is essentially a hollow tube. The electrospray needle 350 used for testing was conductive. To measure the pressure differential of the pumping action by electrospray, the vacuum test chamber utilized in prior experiments had two separate but identical miniature ionization type vacuum gauges. One miniature ionization type vacuum gauge 390 was placed in the upper portion of the vacuum chamber (upstream) while a second miniature ionization type vacuum gauge 400 was placed in the lower portion of the vacuum test chamber (downstream). The vacuum test chamber is designed very similar to a conventional diffusion vacuum pump. There are basically two main zones or volumes: the upstream low pressure zone and the downstream high pressure zone connected to a roughing vacuum pump. The reason for placing two miniature ionization type vacuum gauges on the same vacuum test chamber is to measure a difference between the two pressures over time to determine how much pumping is occurring. During normal operation of the electrospray diffusion pump, a mechanical, diaphragm, or other suitable foreline vacuum pump is connected to the lower exhaust port 380 of the vacuum test chamber 240 to vent any captured gasses. The electrospray process will occur when there is a high voltage differential between the conductive electrospray fluid within the conductive electrospray needle 350 and the extractor 360 that is held in close proximity to the electrospray needle exit aperture. Each zone or volume has an ionization gauge to accurately measure variations in pressure at any time. The two volumes are separated by a metallic cylinder 330 with a small aperture 370 in the center. Above the aperture and axially aligned to the hole 370 in the metallic plate the electrospray needle 350 is located. The electrospray needle 350 intended to create the relative pressure drop in the upper volume is produced from a metallic needle of about 200 μm ID. The electrospray needle 350 is biased with respect to the grounded setup structure to a known voltage. The electrospray needle 350 is electrically isolated using a ceramic holder that also serves as alignment reference with respect to the aperture. The ceramic holder is put in place by a friction fit with the walls of the structure. The extractor loop 360 is also held from this ceramic piece.

Figure 8:
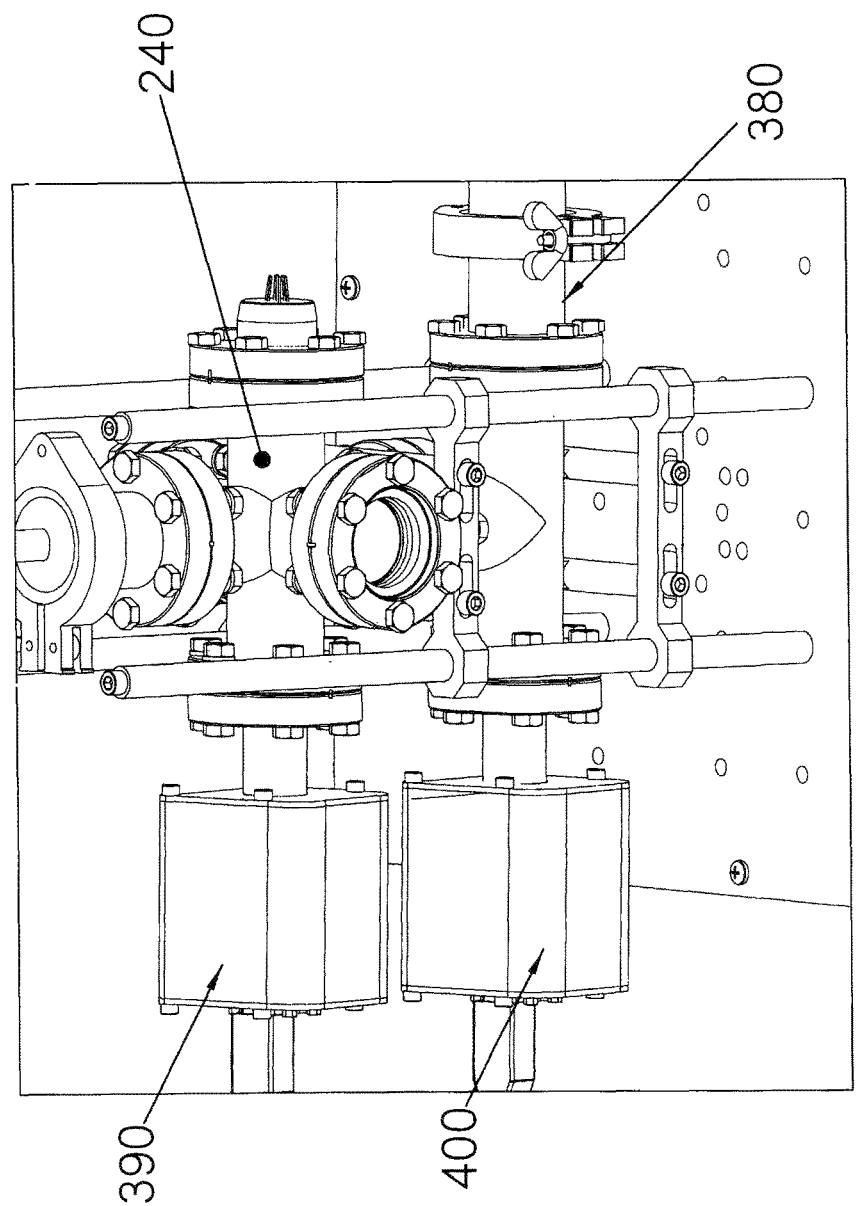
FIG. 8 is a photograph of the actual vacuum test chamber used in the experiments.

FIG. 8 shows a photograph of the actual setup used for the testing. The main housing of the test vacuum chamber 240 contains the electrospray needle 350 that is essentially a hollow tube. The electrospray needle 350 may itself be conductive to allow the electrospray pumping fluid to attain a high voltage, or the electrospray needle may be non-conductive and the high voltage can be held in direct contact with the electrospray fluid—either way, the conductive electrospray fluid will function to produce a Taylor cone and produce a jet of electrospray droplets necessary for pumping to occur. To measure the pressure differential of the pumping action by electrospray, the vacuum test chamber utilized in prior experiments had two separate but identical miniature ionization type vacuum gauges. One miniature ionization type vacuum gauge 390 was placed in the upper portion of the vacuum chamber (upstream) while a second miniature ionization type vacuum gauge 400 was placed in the lower portion of the vacuum test chamber (downstream). The vacuum test chamber is designed very similar to a conventional diffusion vacuum pump. There are basically two main zones or volumes: the upstream low pressure zone and the downstream high pressure zone connected to a roughing vacuum pump. The reason for placing two miniature ionization type vacuum gauges on the same vacuum test chamber is to measure a difference between the two pressures over time to determine how much pumping is occurring. During normal operation of the electrospray diffusion pump, a mechanical, diaphragm, or other suitable foreline vacuum pump is connected to the lower exhaust port 380 of the vacuum test chamber 240 to vent any captured gasses. The electrospray process will occur when there is a high voltage differential between the conductive electrospray fluid within the conductive electrospray needle 350 and the extractor 360 that is held in close proximity to the electrospray needle exit aperture. Each zone or volume has an ionization gauge to accurately measure variations in pressure at any time. The two volumes are separated by a metallic cylinder 330 with a small aperture 370 in the center. Above the aperture and axially aligned to the hole 370 in the metallic plate the electrospray needle 350 is located. The vacuum test chamber was assembled from standard "off the shelf" Con Flat (CF) vacuum-rated components. The use of standard parts allows a simple design, connectivity and accessibility; however, it is also true that these parts inherently produce large working volumes that might be challenging to pump down using a single electrospray source. In one configuration, the vacuum chamber is pumped down by a separate vacuum system through a direct connection to one of its 2¾ CF flanges. This setup has a chamber with two 70 l/s turbomolecular pumps. For some experiments a cold trap filled with liquid nitrogen was used between both systems to prevent contamination. In any event, these preliminary connections are not optimal and may reduce significantly the pumping conductance, which proved to be critical in our experiments. A preferred embodiment, obvious to those skilled in the art, will require the use of a dedicated pumping system directly attached to the custom (small) vacuum chamber.

Figure 9:
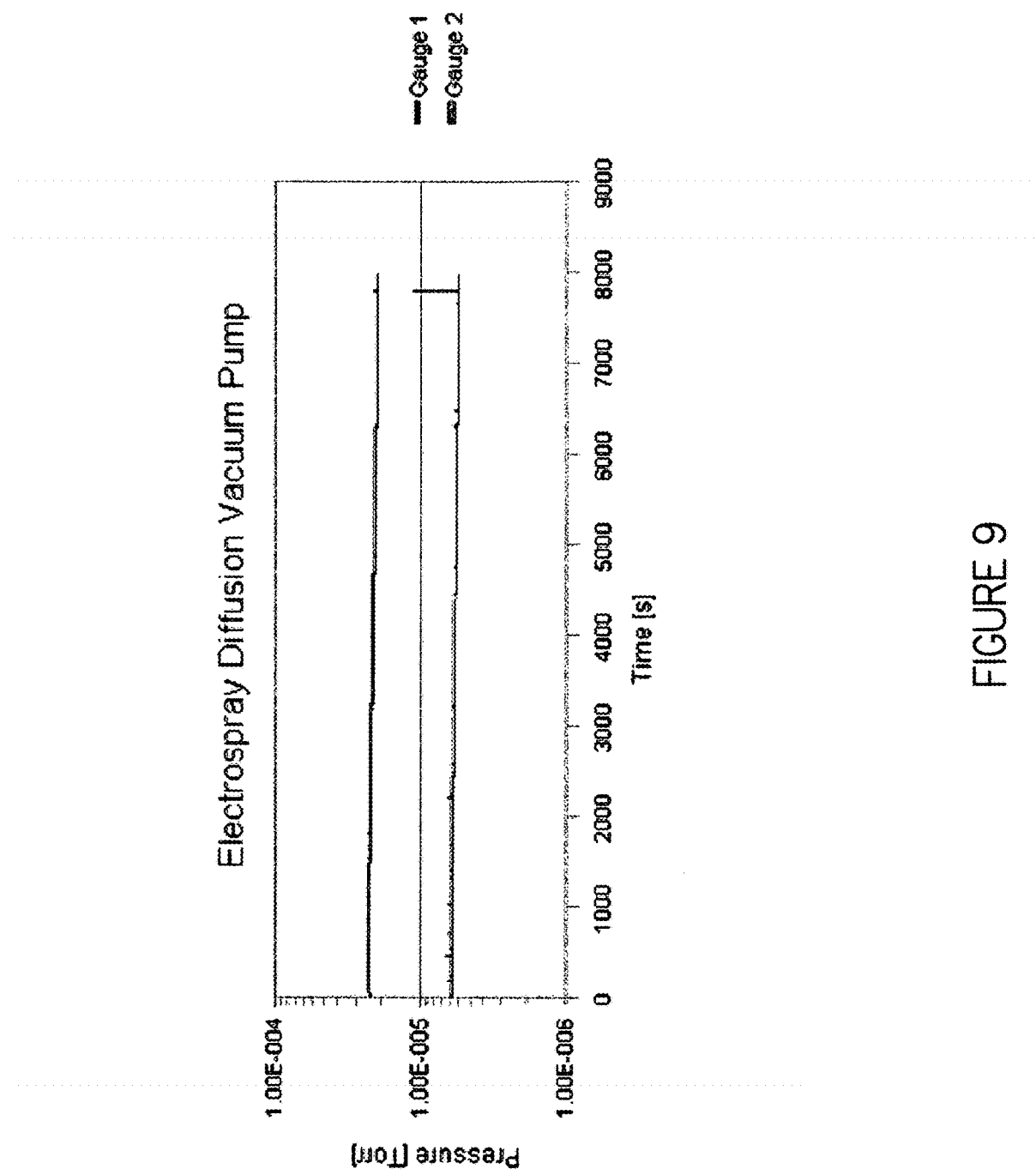
FIG. 9 shows a graph that illustrates the background pressure over time within each of the volumes (Upper and lower) within the vacuum test chamber as measured by the ionization vacuum gauges.

FIG. 9 graphically shows the results of the background within the vacuum test without any electrospray running. To measure the effect of electrospray pumping on the pressure difference in the two volumes, it is important to first characterize the pressure profiles of the two volumes when there is no electrospray acting. This yields control profiles for pressure changes when leaks and outgassing equilibrate with the pumping capacity of the backing pump. With this characterization, pressure changes due to the electrospray could be identified and separated from other effects. Gauge 1 is the upper ionization vacuum gauge 390, while Gauge 2 is the lower ionization vacuum gauge 400. It is important to note that this profile will not be exactly the same in all experiments. One difference is that experiments were carried out at different background pressures. Another difference is that tests were also done before reaching equilibrium. As expected, the upper volume as measured by gauge 1 390 will have a greater pressure than the lower volume as measured by gauge 2 400. This is due to the low conductance between volumes given by the aperture and the fact that the lower volume is closer to the backing pump inlet.

The electrospraying process consists of the following steps:
1) Pump down the test chamber with the backing pump and have and additional pump for the working fluid container
2) Start ion gauges and data logger
3) Apply potential difference between emitter and extractor
4) Pressurize working fluid container
5) Wait for liquid to arrive at tip and observe "Taylor Cone" formation The working fluid is pumped by means of the atmospheric pressure only. This restricts the controllability of flow rate, which is done by choosing the correct size of capillary for a given fluid viscosity. From the scaling analysis discussed in the patent, three working fluids were chosen:
Vacuum pump oil doped with ionic liquid (Doped VPO)
Formamide
Glycerol

| Working Fluid | Viscosity [Pa s] | Conductivity [Si/m] | Surface Tension [N/m] | Dielectric Constant | Density [kg/m$^3$] | Vapor Pressure [Torr] |
|---|---|---|---|---|---|---|
| Doped VPO | 0.05 | $1 \times 10^{-7}$ | 0.05 | 50 | 870 | $\sim 1 \times 10^{-9}$ |
| Formamide | 0.0033 | $\sim 1 \times 10^{-4}$ | 0.06 | 109.5 | 1133 | $8 \times 10^{-2}$ |
| Glycerol | 0.945 | 0.081 | 0.063 | 42.5 | 1258 | $1 \times 10^{-3}$ |

Capillary sizes used were 1 m long:
150 μm ID (For doped VPO and Glycerol)
50 μm ID (For formamide)
For which the flow rates result in the following (Poiseuille flow):
Doped VPO: 1.6079 mm$^3$/min
Formamide: 0.2826 mm$^3$/min
Glycerol: 0.0799 mm$^3$/min These numbers show a flow rate that is towards the lower limit for stable electrospray. Doped VPO low conductivity made electrospraying the liquid challenging, commonly being in the unstable regime in which the non-dimensional quantity related to the flow rate Q introduced by F. de la Mora $$\eta = \sqrt{\frac{\rho K Q}{\gamma \varepsilon \varepsilon_0}}$$

becomes smaller than unity. In here ρ is the liquid density, K is the conductivity, γ is the surface tension and ∈ is the dielectric constant.

For the diffusion vacuum pump application, an unstable electrospray will yield uncertain results, since the droplet size will not follow regular scaling laws. Experiments done in the unstable regime are shown with a characteristic noise in the measurements.

Figure 10:
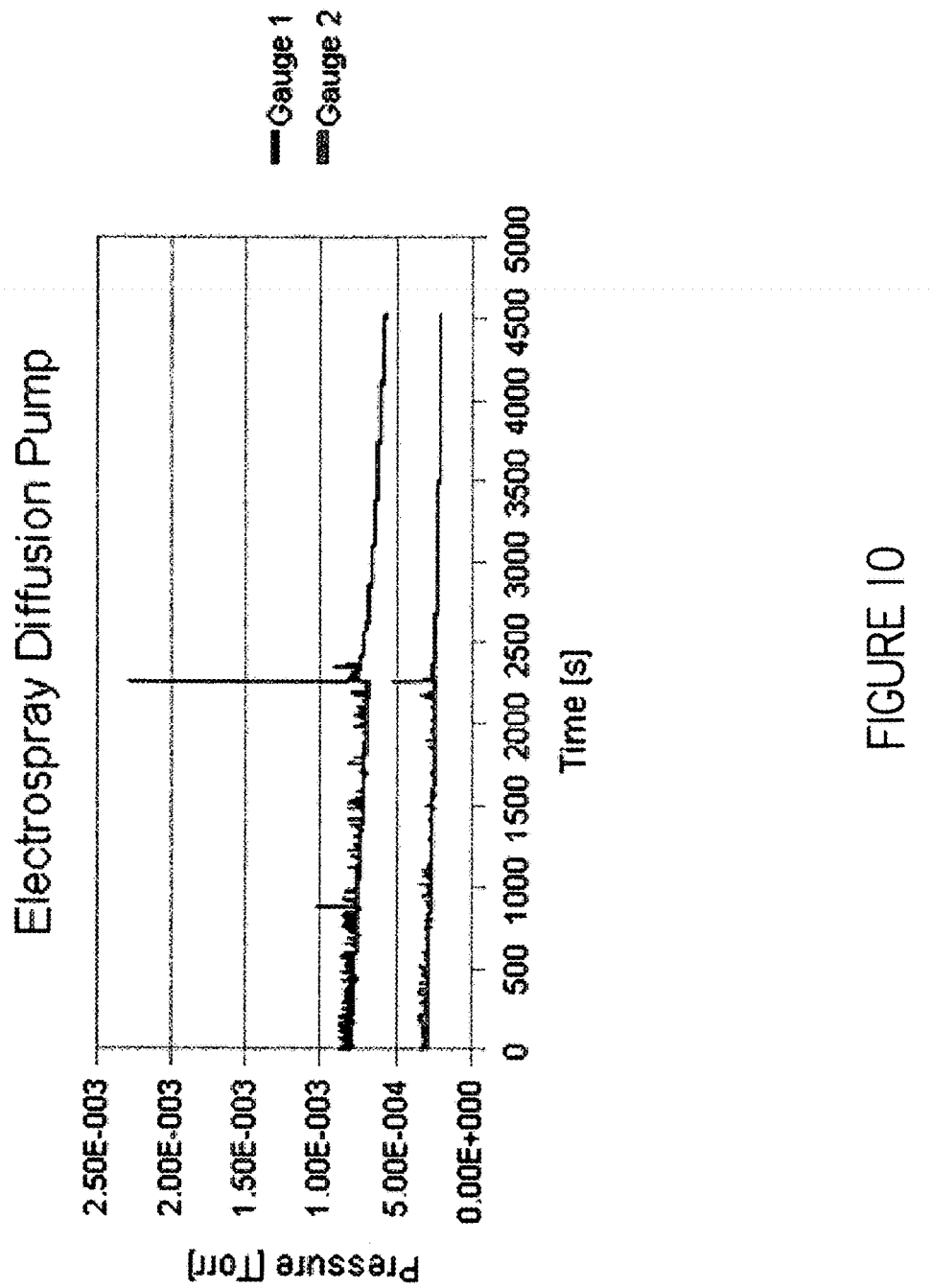
FIG. 10 shows a graph that illustrates the pressure over time as measured by the two ionization vacuum gauges resulting from an unstable electrospray using glycerol as an electrospray fluid.

FIG. 10 shows a graph that illustrates the pressure over time as measured by the two ionization vacuum gauges resulting from an unstable electrospray using glycerol as an electrospray fluid. Gauge 1 is the upper ionization vacuum gauge 390, while Gauge 2 is the lower ionization vacuum gauge 400. For the electrospray diffusion vacuum pump application, an unstable electrospray will yield uncertain results, since the droplet size will not follow regular scaling laws. Experiments done in the unstable regime are shown with a characteristic noise in the measurements.

Figure 11:
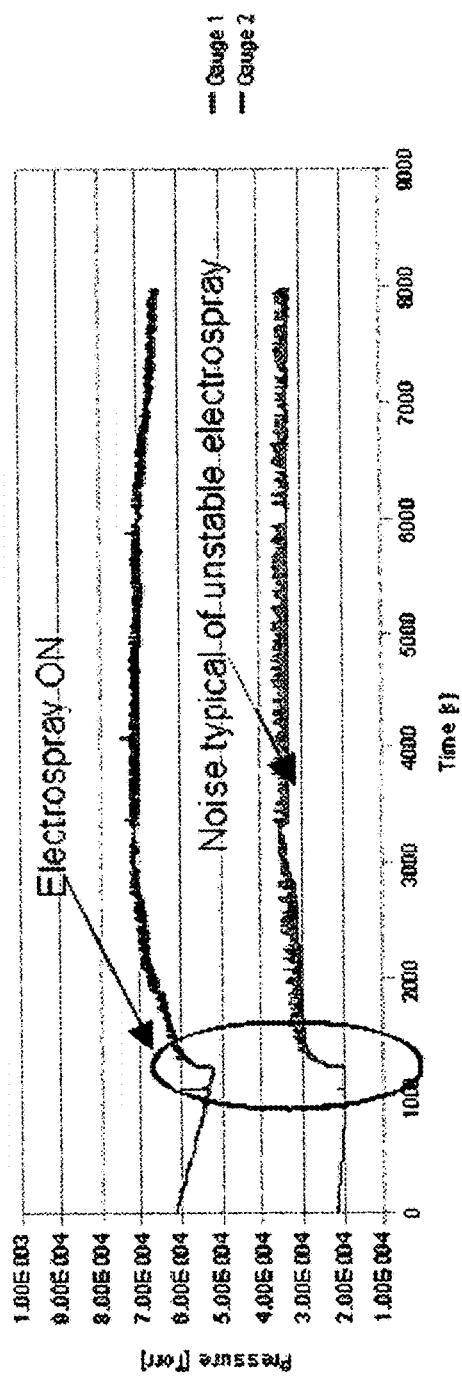
FIG. 11 shows a graph that illustrates the pressure over time as measured by the two ionization vacuum gauges resulting from an unstable electrospray using glycerol with a lower flow rate, but higher conductivity as an electrospray fluid.

FIG. 11 shows a graph that illustrates the pressure over time as measured by the two ionization vacuum gauges resulting from an unstable electrospray using glycerol as an electrospray fluid. Gauge 1 is the upper ionization vacuum gauge 390, while Gauge 2 is the lower ionization vacuum gauge 400. The glycerol solution used here had a lower flow rate, but a higher conductivity. Although in the unstable regime, electrospraying of the glycerol solution had a measurable effect on the pressure profiles. Experiments done in the unstable regime are shown with a characteristic noise in the measurements.

Figure 12:
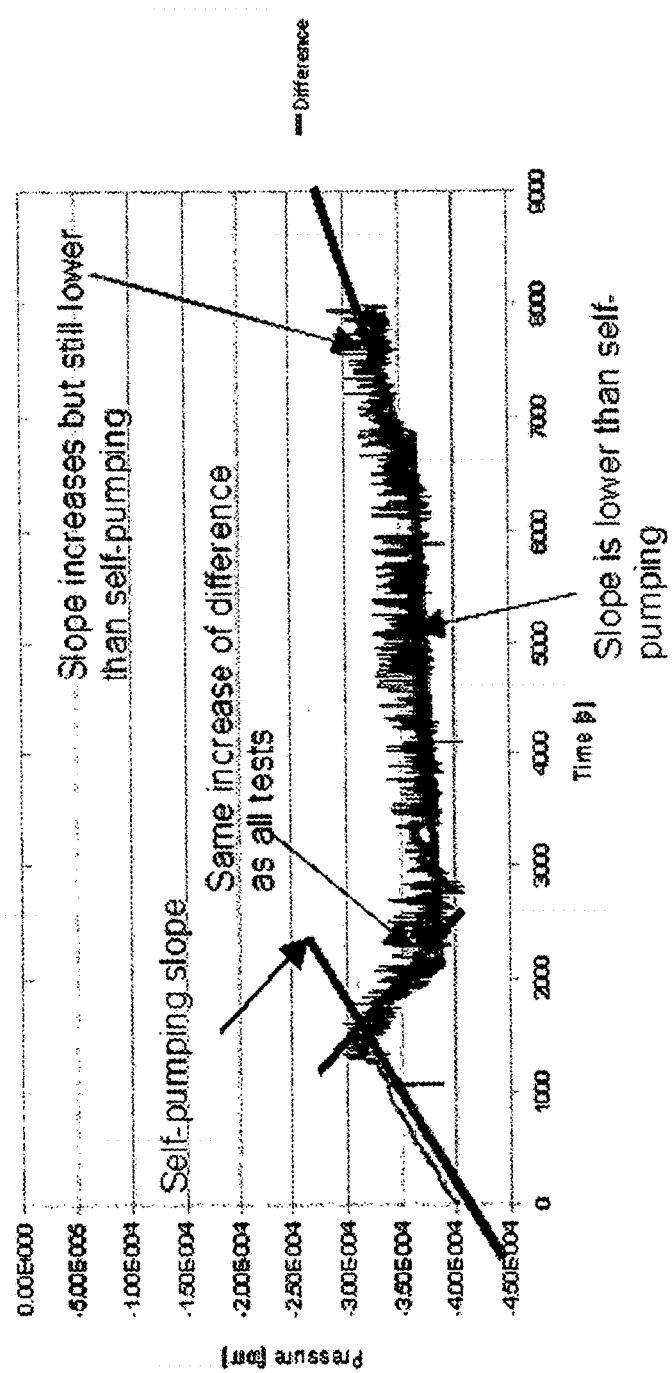
FIG. 12 shows a graph that illustrates the pressure differential over time as measured by the two ionization vacuum gauges resulting from an unstable electrospray using glycerol as an electrospray fluid. The glycerol used here had a lower flow rate but a higher conductivity.

FIG. 12 shows a graph that illustrates the pressure differential over time as measured by the two ionization vacuum gauges resulting from an unstable electrospray using glycerol as an electrospray fluid. Gauge 1 is the upper ionization vacuum gauge 390, while Gauge 2 is the lower ionization vacuum gauge 400. The glycerol solution used here had a lower flow rate, but a higher conductivity. Although in the unstable regime, electrospraying of the glycerol solution had a measurable effect on the pressure profiles. Experiments done in the unstable regime are shown with a characteristic noise in the measurements.

All experiments reported here were performed in the lower limit of stability. In cases when operation is unstable the mean-free-path might be very different from the expected value at a given flow rate. This would mean that ambient particles might interact too poorly with the spray droplets, decreasing the pumping effect below the limit for which adequate measurements could be made.

To further complement the experiments, an Ionic Liquid Ion Source (ILIS) was tested. According to the scaling in the patent, pure ion beams from ILIS would be inadequate for this application, as the particle size (molecule size) is too small and the particle speed too high. Mean-free-paths will be larger as ionic liquids with conductivities that are high. In summary, it could have a pumping effect, but it is expected to be very low (out of the precision of the gauges). It is interesting to note that there is a small increase in the pressure when the ILIS is on, likely due to the generation of volatiles when ions hit the structure walls. The pressure difference drops, but apparently follows the same profile as it has when ILIS is off. In conclusion there is no clear evidence of pumping in this case.

Doped VPO and formamide did not yield clear pumping effects.

Doped VPO was always in the unstable regime for the range of conditions tested. This is the lowest vapor pressure fluid used in the study, so it should remain as a viable option, since it was proved in this research that under atmospheric conditions a stable electrospray was achievable. A stable electrospray with this fluid should be possible, but will require important modifications to the current setup.

Even though the formamide solution operated always in the stable regime, its very low conductivity meant large flow rates such that the pressure in volume 1 increased too quickly and gauge 1 shutdown for overpressure protection, in all tests. A possible solution for Formamide would be to operate at larger conductivities.

Figure 13:
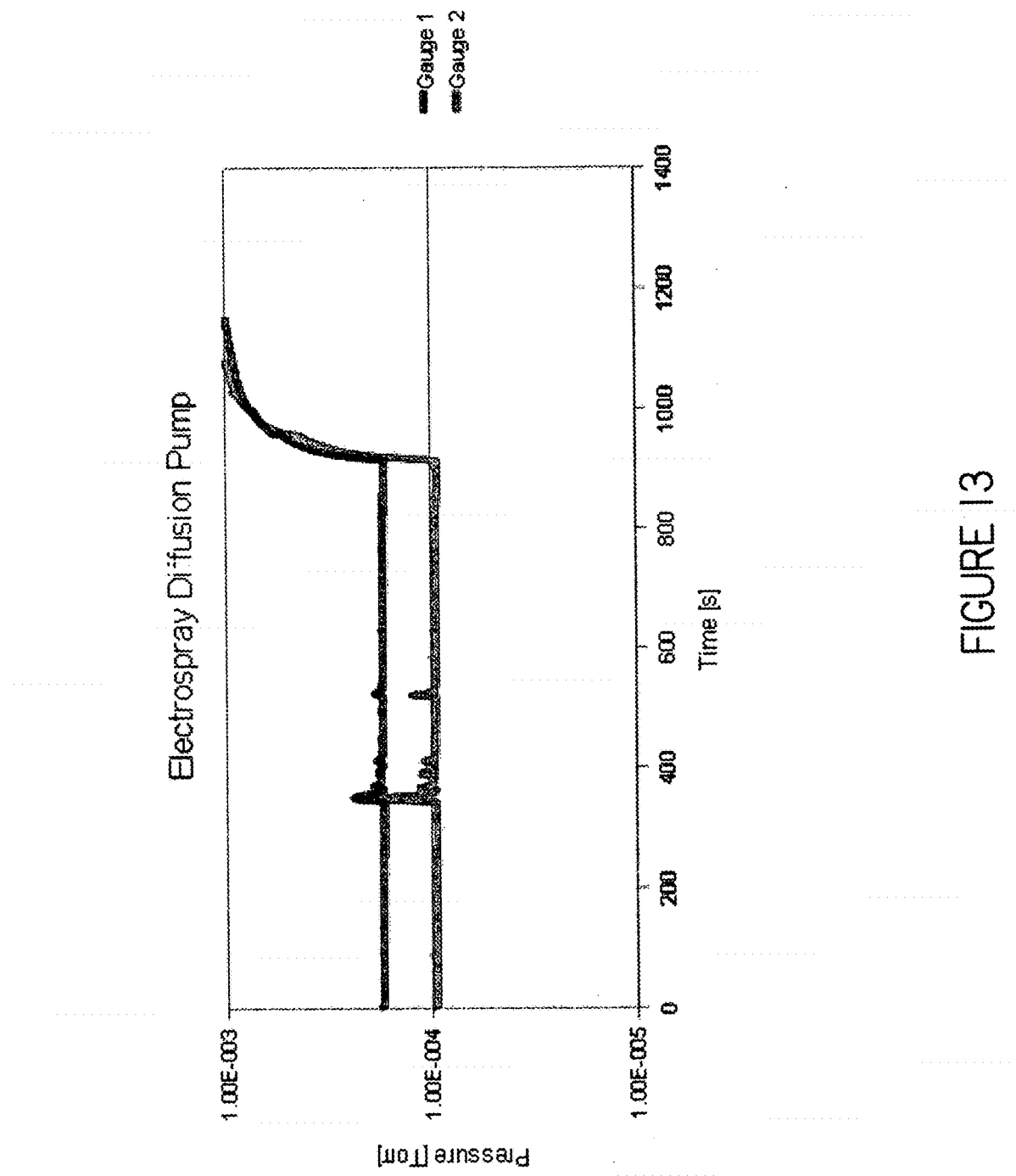
FIG. 13 shows a graph that illustrates the pressure over time as measured by the two ionization vacuum gauges resulting from an unstable electrospray using glycerol as an electrospray fluid. The glycerol used here had a lower flow rate but a higher conductivity.
Figure 14:
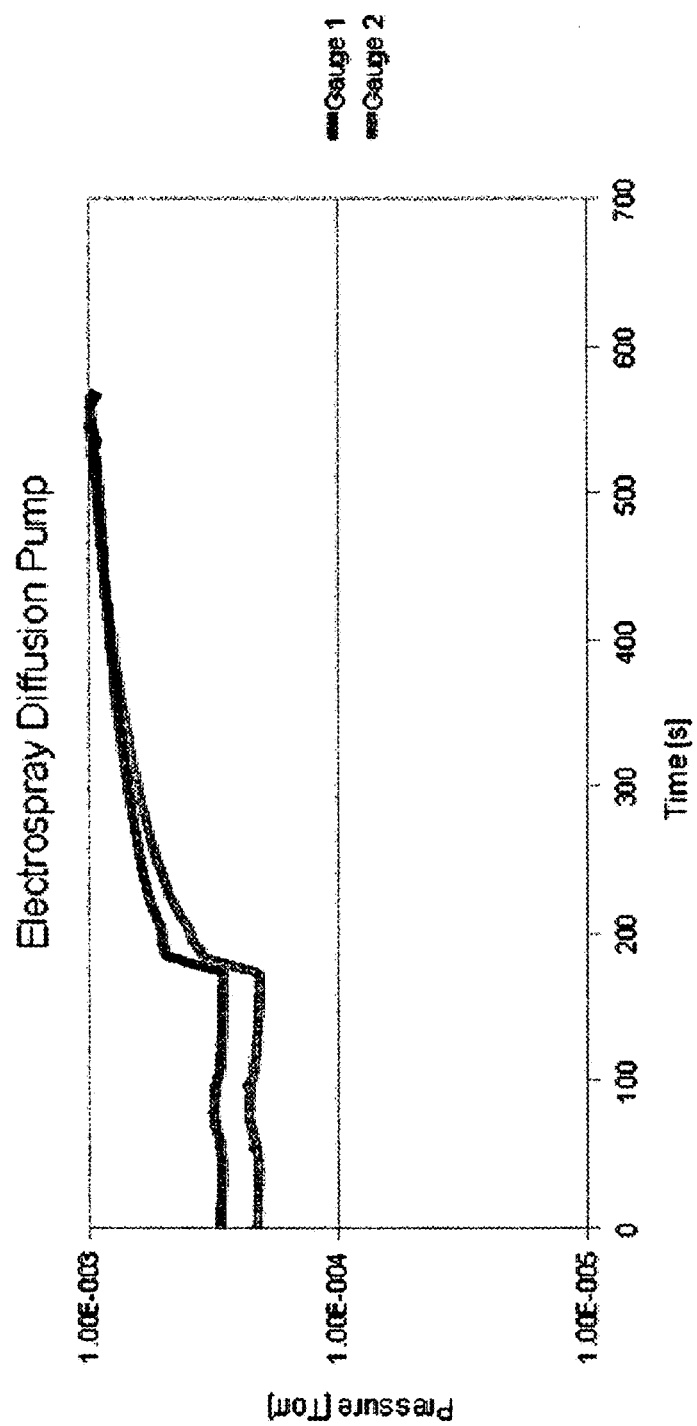
FIG. 14 shows a graph that illustrates the pressure over time as measured by the two ionization vacuum gauges resulting from an unstable electrospray using glycerol as an electrospray fluid. The glycerol used here had a lower flow rate but a higher conductivity.

FIG. 13 shows the operation of the electrospray diffusion pump utilizing glycerol as an electrospray pumping fluid. The glycerol electrospray source was tested at 2.9 kV. As a general result pressure increased in both areas. It is interesting to note that pressure tend to rise to $10^{-3}$ Torr, which is near the vapor pressure of glycerol. Measured electrospray current was 160 nA ($10^{-9}$ Amps). The pressure difference is the difference between the Gauge 2 and the Gauge 1 readings. This test is significant since it shows what is the first indication of electrospray pumping. With the electrospray active, a rise in pressure of both gauges is observed, but the difference became smaller until crossed zero and in fact the pressure in volume 1 became lower than the pressure in volume 2. If it were for the pressure raise this would unequivocally be evidence of pumping. The setup included the cold trap between the electrospray fixture and the roughing pump. This would reduce the pumping capacity, especially because it was needed to reduce the tubing diameter to fit the trap. This reduces significantly the pumping speed of the backing pump on the system contributing to the observed pressure rise. The accumulation of glycerol on the extractor edge that degasses to its vapor pressure value also accounts for the pressure increase in the fixture. In some cases, the glycerol deposit in the extractor was large enough to be seen. The maximum pressure difference measured in this test was $1\times10^{-4}$ Torr. In conclusion, the pressure downstream became higher than the pressure upstream. In case there was no pumping, pressures should increase in the same amount at similar rates. This observation was repeated and results are similar. In this second experiment, the amount of electrosprayed liquid is lower than the first experiment and the effect remains. Also the second experiment is done at higher background pressure FIG. 14 shows the operation of the electrospray diffusion pump utilizing glycerol as an electrospray pumping fluid. Measured electrospray current was 120 nA ($10^{-9}$ Amps). The pressure difference is the difference between the Gauge 2 and the Gauge 1 readings. Another test was carried out with a lower flow rate showing the same effect as the previous one. Unfortunately at this flow rate, the emitter became unstable for the last part of the test and data collection stopped as Gauge 1 stopped measuring for overpressure protection. These results are clearer as the rate at which pressure increases is much slower. In this case the pressure in the chamber increases to a value close to the vapor pressure of glycerol. It could be argued that results are due to gauge gain or gauge calibration. These hypotheses are ruled out by observing the pressure profiles when there is no electrospray acting. If it was gauge calibration, the measurements would show similar trends when the electrospray is not acting, say when pressure is decreasing from atmosphere to rough vacuum, or when the electrospray is shut down and the pressure decreases.

Figure 15:
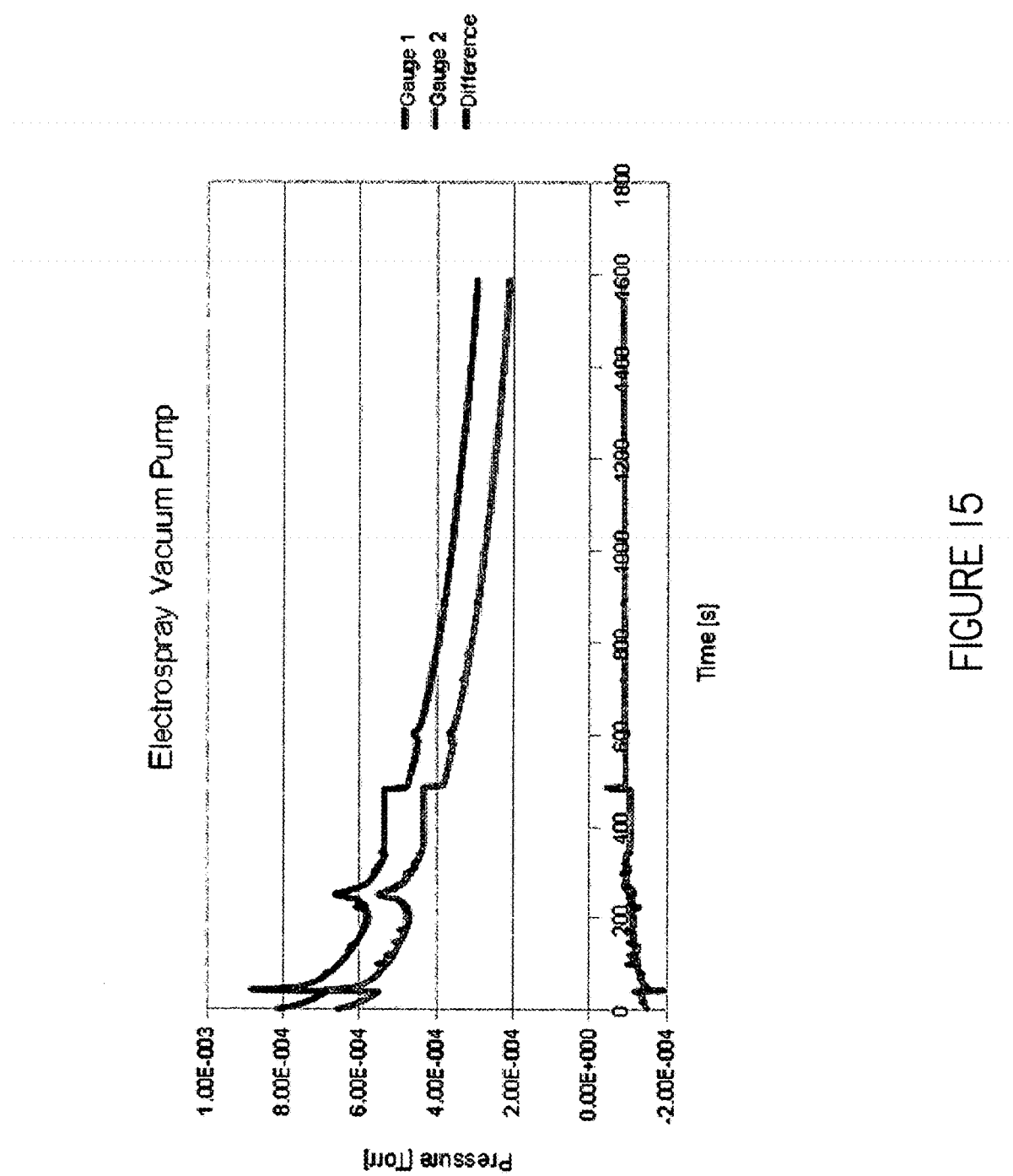
FIG. 15 shows a graph that illustrates the pressure differential over time as measured by the two ionization vacuum gauges resulting when the electrospray was shut down.

FIG. 15 shows a graph that illustrates the pressure over time as measured by the two ionization vacuum gauges resulting from an unstable electrospray using glycerol as an electrospray fluid. Gauge 1 is the upper ionization vacuum gauge 390, while Gauge 2 is the lower ionization vacuum gauge 400. The results seen in FIG. 14 could be argued that they are due to gauge gain or gauge calibration. These hypotheses are ruled out by observing the pressure profiles when there is no electrospray acting. If it was gauge calibration, the measurements would show similar trends when the electrospray is not acting, say when pressure is decreasing from atmosphere to rough vacuum, or when the electrospray is shut down and the pressure decreases, as shown in the FIG. 15.

REFERENCE NUMERALS

FIG. 1:
10 Main inlet opening of the diffusion pump.
20 Main inlet opening flange that will attach to vacuum chamber.
30 Hollow tube that coils around the diffusion pump and carries cooling fluid.
40 Main outlet opening flange that will attach to mechanical vacuum pump.
50 Protective cover that encloses the heater assembly.
60 Foreline exhaust nozzle that connects the diffusion pump to the mechanical vacuum pump.
70 Finned boiler plate that attaches to the heater element to transfer heat to the oil reservoir.
80 Heater element.
90 Oil reservoir.
100 Main body of the diffusion pump.
110 Inner surrounding fractional tube angled jet assembly.
120 Central inner fractional tube angled jet assembly.
130 Outer fractional tube angled jet assembly.
140 Central inner fractional tube for directing oil vapor to angled jet assembly.
150 Inner surrounding fractional tube for directing oil vapor to angled jet assembly.
160 Foreline baffle.
170 Ejector stage.
180 Outermost surrounding fractional tube for directing oil vapor to angled jet assembly.

FIG. 2:
10 Main inlet opening of the diffusion pump.
20 Main inlet opening flange that will attach to vacuum chamber.
30 Hollow tube that coils around the diffusion pump and carries cooling fluid.
40 Main outlet opening flange that will attach to mechanical vacuum pump.
50 Protective cover that encloses the heater assembly.
60 Foreline exhaust nozzle that connects the diffusion pump to the mechanical vacuum pump.
70 Finned boiler plate that attaches to the heater element to transfer heat to the oil reservoir.
80 Heater element.
90 Oil reservoir.
100 Main body of the diffusion pump.
110 Inner surrounding fractional tube angled jet assembly.
120 Central inner fractional tube angled jet assembly.
130 Outer fractional tube angled jet assembly.
140 Central inner fractional tube for directing oil vapor to angled jet assembly.
150 Inner surrounding fractional tube for directing oil vapor to angled jet assembly.
160 Foreline baffle.
170 Ejector stage.
180 Outermost surrounding fractional tube for directing oil vapor to angled jet assembly.
190 Oil vapor that has been ejected from the central inner fractional tube angled jet assembly.
200 Oil vapor that has been ejected from the inner surrounding fractional tube angled jet assembly.
210 Oil vapor that has been ejected from the outermost surrounding fractional tube angled jet assembly.
220 Oil vapor and captured gas molecules that are exiting the diffusion pump through the foreline to the mechanical vacuum pump.
230 Captured gas molecules that have been pulled out of the vacuum chamber shown exiting to the mechanical vacuum pump.

FIG. 3:
240 Main housing of the vacuum test chamber.
250 Section of hollow tube used to convey the electrospray fluid to the electrospray needle.
260 Small reservoir containing the electrospray fluid.
270 Valve used to regulate the gas pressure into the electrospray fluid reservoir.
280 Reservoir of pressurized gas that will be used to regulate the flow rate of the electrospray fluid from the reservoir.
290 Hollow tube that will be used to convey the pressurized gas in the reservoir to the electrospray fluid reservoir.
300 Conductive wire that connects one side of the high voltage supply to the electrospray needle.
310 Conductive wire that connects one side of the high voltage supply to the extractor ring.
320 High voltage supply that provides the high voltage required needed to create an electrospray.
330 Hollow metal cylinder placed within the vacuum test chamber.
340 Non-conductive insulator used to electrically isolate the high voltage electrospray needle from the metal walls of the vacuum test chamber.
350 Electrospray needle.
360 Extractor ring.
370 Hole placed in hollow metal cylinder.
380 Hollow tube that allows connection to an external mechanical vacuum pump.
390 Ionization type vacuum gauge used to monitor the pressure over time of the upper (upstream) portion of the vacuum test chamber.
400 Ionization type vacuum gauge used to monitor the pressure over time of the lower (downstream) portion of the vacuum test chamber.

FIG. 4:
240 Main housing of the vacuum test chamber.
250 Section of hollow tube used to convey the electrospray fluid to the electrospray needle.
260 Small reservoir containing the electrospray fluid.
270 Valve used to regulate the gas pressure into the electrospray fluid reservoir.
280 Reservoir of pressurized gas that will be used to regulate the flow rate of the electrospray fluid from the reservoir.
290 Hollow tube that will be used to convey the pressurized gas in the reservoir to the electrospray fluid reservoir.
300 Conductive wire that connects one side of the high voltage supply to the electrospray needle.
310 Conductive wire that connects one side of the high voltage supply to the extractor ring.
320 High voltage supply that provides the high voltage required needed to create an electrospray.
330 Hollow metal cylinder placed within the vacuum test chamber.
340 Non-conductive insulator used to electrically isolate the high voltage electrospray needle from the metal walls of the vacuum test chamber.

350 Electrospray needle.
360 Extractor ring.
370 Hole placed in hollow metal cylinder.
380 Hollow tube that allows connection to an external mechanical vacuum pump.
390 Ionization type vacuum gauge used to monitor the pressure over time of the upper (upstream) portion of the vacuum test chamber.
400 Ionization type vacuum gauge used to monitor the pressure over time of the lower (downstream) portion of the vacuum test chamber.
410 Electrospray plume of charged droplets produced by the Taylor Cone of the electrospray needle.

FIG. 5:
Shows a graph that illustrates the dependence of the mean free path on flow rate through a calculated parameter and the liquid conductivity for a liquid of unit specific gravity, an applied voltage of 2000 V, emitter spacing of 0.5 mm, surface tension of 0.05 N/m and dielectric constant of 50.

Figure 6:
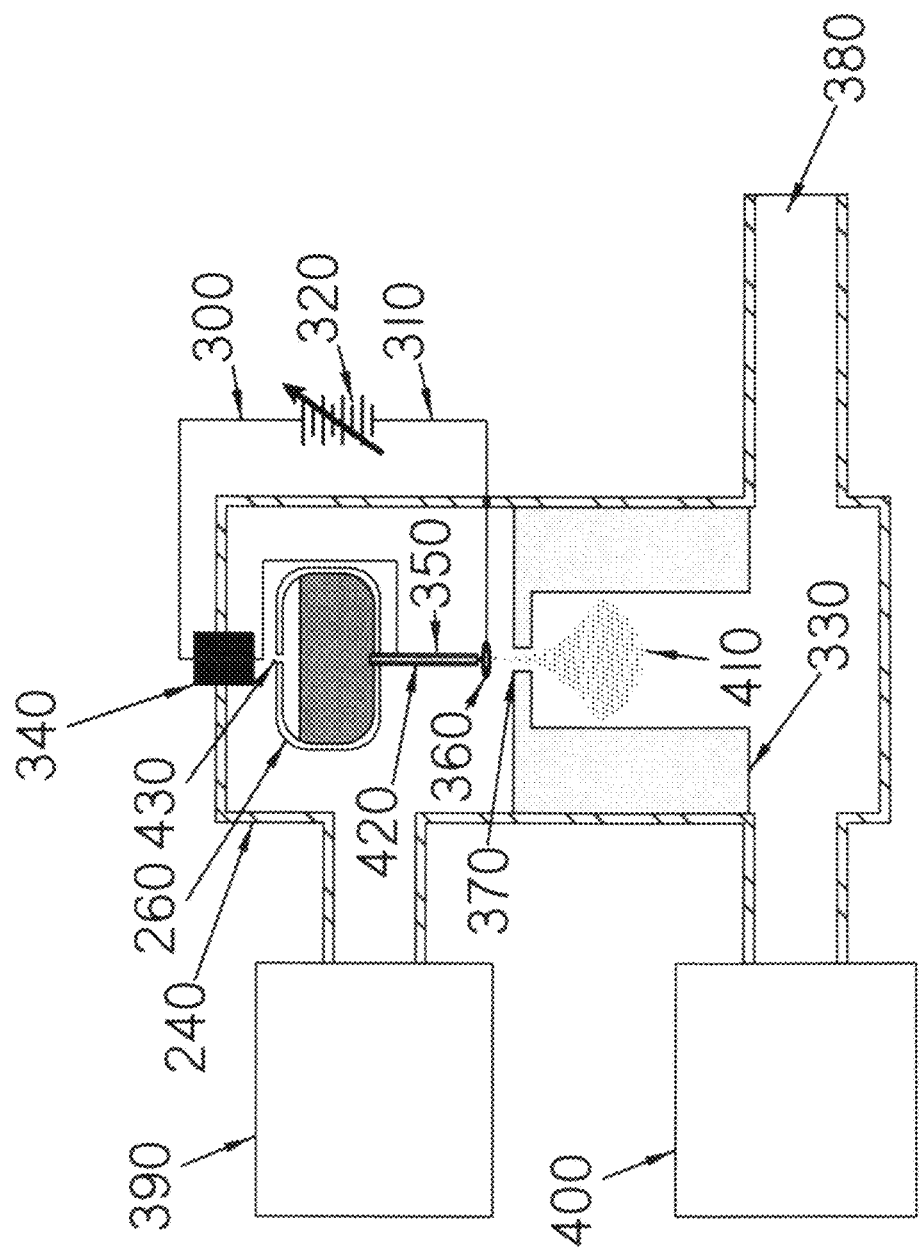
FIG. 6 is a schematic diagram of the proposed electrospray based diffusion vacuum pump showing the working electrospray with the electrospray fluid reservoir located inside the pump.

FIG. 6:
240 Main housing of the vacuum test chamber.
260 Small reservoir containing the electrospray fluid.
300 Conductive wire that connects one side of the high voltage supply to the electrospray needle.
310 Conductive wire that connects one side of the high voltage supply to the extractor ring.
320 High voltage supply that provides the high voltage required needed to create an electrospray.
330 Hollow metal cylinder placed within the vacuum test chamber.
340 Non-conductive insulator used to electrically isolate the high voltage electrospray needle from the metal walls of the vacuum test chamber.
350 Electrospray needle.
360 Extractor ring.
370 Hole placed in hollow metal cylinder.
380 Hollow tube that allows connection to an external mechanical vacuum pump.
390 Ionization type vacuum gauge used to monitor the pressure over time of the upper (upstream) portion of the vacuum test chamber.
400 Ionization type vacuum gauge used to monitor the pressure over time of the lower (downstream) portion of the vacuum test chamber.
410 Electrospray plume of charged droplets produced by the Taylor Cone of the electrospray needle.
420 Fibrous wicking material used to provide a capillary feed for the electrospray.
430 Small hole to allow venting of the electrospray fluid reservoir.

Figure 7:
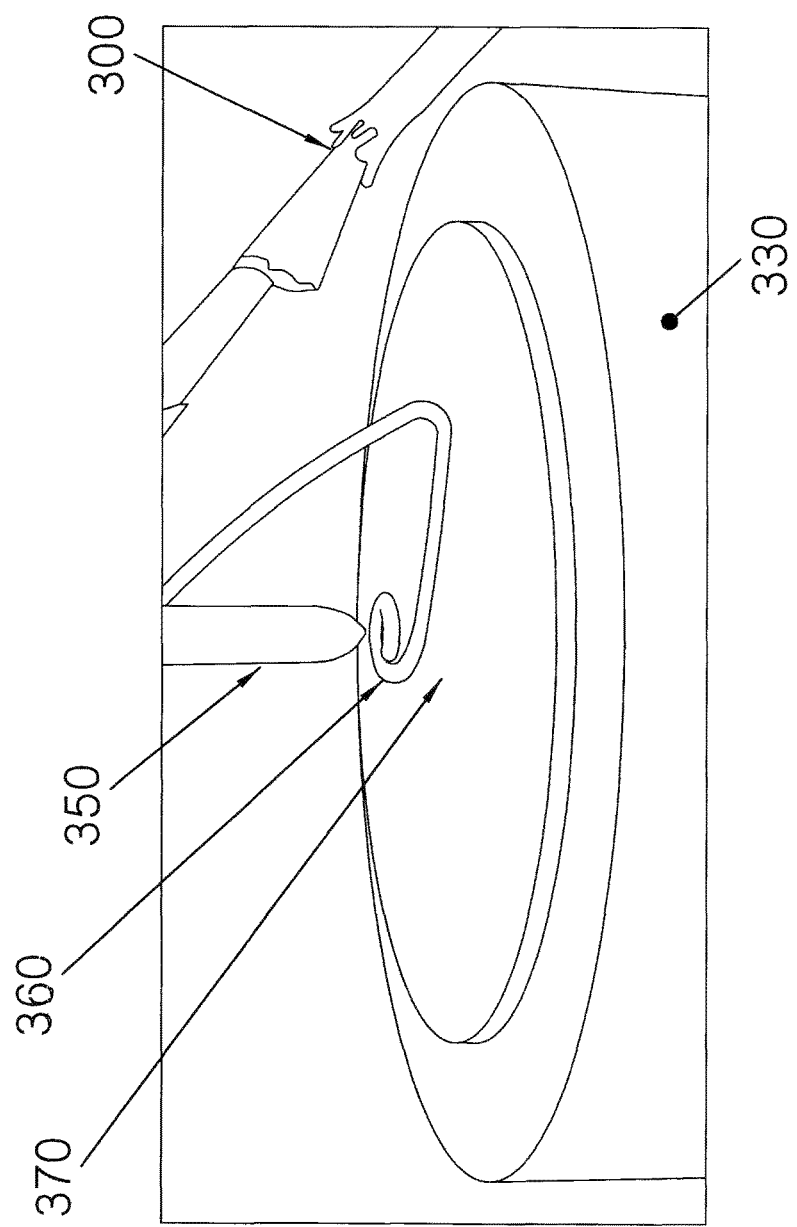
FIG. 7 is a photograph of the actual electrospray needle and extractor ring used in the experiments.

FIG. 7:
300 Conductive wire that connects one side of the high voltage supply to the electrospray needle.
330 Hollow metal cylinder placed within the vacuum test chamber.
350 Electrospray needle.
360 Extractor ring.
370 Hole placed in hollow metal cylinder.

FIG. 8:
240 Main housing of the vacuum test chamber.
380 Hollow tube that allows connection to an external mechanical vacuum pump.
390 Ionization type vacuum gauge used to monitor the pressure over time of the upper (upstream) portion of the vacuum test chamber.
400 Ionization type vacuum gauge used to monitor the pressure over time of the lower (downstream) portion of the vacuum test chamber.

FIG. 9:
Shows a graph that illustrates the background pressure over time within each of the volumes (Upper and lower) within the vacuum test chamber as measured by the ionization vacuum gauges.

FIG. 10:
Shows a graph that illustrates the pressure over time as measured by the two ionization vacuum gauges resulting from an unstable electrospray using glycerol as an electrospray fluid.

FIG. 11:
Shows a graph that illustrates the pressure over time as measured by the two ionization vacuum gauges resulting from an unstable electrospray using glycerol as an electrospray fluid. The glycerol used here had a lower flow rate but a higher conductivity.

FIG. 12:
Shows a graph that illustrates the pressure differential over time as measured by the two ionization vacuum gauges resulting from an unstable electrospray using glycerol as an electrospray fluid. The glycerol used here had a lower flow rate but a higher conductivity.

FIG. 13:
Shows a graph that illustrates the pressure differential over time as measured by the two ionization vacuum gauges resulting from an unstable electrospray using glycerol as an electrospray fluid. The glycerol used here had a lower flow rate but a higher conductivity. The electrospray current was 160 nA ($10^{-9}$ Amps)

FIG. 14:
Shows a graph that illustrates the pressure differential over time as measured by the two ionization vacuum gauges resulting from an unstable electrospray using glycerol as an electrospray fluid. The glycerol used here had a lower flow rate but a higher conductivity. The electrospray current was 120 nA ($10^{-9}$ Amps)

FIG. 15:
Shows a graph that illustrates the pressure differential over time as measured by the two ionization vacuum gauges resulting when the electrospray was shut down.

REFERENCES

Hablanian, Marsbed. "High Vacuum Techniques: A Practical Guide", Marcel Dekker, Inc., 2'nd Edition, 1997, ISBN: 0-8247-9834-1
Zeleny, John, Proc. Phil. Soc.(Camb.) 18, 71 (1915); Phys. Rev. 3, 68 (1914)
Dole M., Mack L. L., Hines R. L., Mobley R. C., Ferguson L. D., Alice M. B., *Journal of Chemical Physics,* 1968, 49(5), p. 2240
Rayleigh, Phil. Mag. 14, 184 (1882)
Yamashita M., Fenn, J. B., *Journal of Physical Chemistry,* 1984, 88(20), p. 4671
Fenn, J. B.; Mann, M.; Meng, C. K.; Wong, S. F.; Whitehouse, C. M. (1989). *Science* 246 (4926): 64-71

What is claimed is:
1. An electrospray diffusion vacuum pump for creating a charged droplet plume capable of collisions between the plume and an ambient gas, comprising: an electrospray source having a conductive tube source with a wick inserted within the conductive tube source; the conductive tube source having a source tip connected to a pole of a power supply and through which or over which a conductive or semi-conductive fluid is driven to flow hydrostatically or by capillary action, the source tip being placed within a vessel having an aperture such that the aperture is connected to an opposite pole of the power supply, wherein a potential of the power supply is adjusted such that a Taylor Cone is formed at the source tip resulting in a plume of charged droplets attracted to the aperture, the plume of charged droplets forming a jet of charged droplets passing through the aperture to produce pumping of gas from the vessel through the aperture to reduce pressure in the vessel, the conductive or semi-conductive fluid having a vapor pressure as low as $10^{-10}$ torr, and the conductivity of the conductive or semi-conductive fluid being such that it remains in the range $10^{-5}$-$10^{-3}$ Si/m.

2. An electrospray diffusion vacuum pump for creating a charged droplet plume capable of collisions between the plume and an ambient gas, comprising: a housing containing an upper vacuum chamber and a lower vacuum chamber separated by an electrospray source, the electrospray source having a conductive tube source with a wick inserted within a conductive tube, the conductive tube forming a source tip within the upper vacuum chamber, the conductive tube being connected to a pole of a power supply, the conductive tube being coupled to receive a conductive or semi-conductive spray fluid having a conductivity, wherein the conductive or semi-conductive spray fluid is driven to flow hydrostatically or by capillary action from the source tip placed within the upper vacuum-chamber, a metal cylinder coupling the upper vacuum chamber to the lower vacuum chamber and having an aperture, the aperture providing a path for droplets formed from the conductive or semi-conductive spray fluid to pass from the upper vacuum chamber to the lower vacuum chamber, the metal cylinder being connected to an opposite pole of the power supply, wherein a potential of the power supply is adjusted such that a Taylor Cone is formed at the source tip resulting in a plume of charged droplets being attracted to the aperture and forming a jet of droplets passing through the aperture, the conductive or semi-conductive fluid having a vapor pressure as low as $10^{-10}$ torr, and the conductivity of the conductive or semi-conductive spray fluid being such that it remains in the range $10^{-5}$-$10^{-3}$ Si/m.

3. An electrospray diffusion vacuum pump for creating a charged droplet plume capable of collisions between the plume and an ambient gas, comprising:
a housing containing
an upper vacuum chamber and
a lower vacuum chamber separated by
an electrospray source, the electrospray source having
a conductive tube source with
a wick inserted within a conductive tube, the conductive tube forming
a source tip within the upper vacuum chamber,
the conductive tube being connected to
a pole of
a power supply,
the conductive tube being coupled to receive
a conductive or semi-conductive spray fluid having
a conductivity, wherein the conductive or semi-conductive spray fluid is driven to flow hydrostatically or by capillary action from the source tip,
a metal cylinder coupling the upper vacuum chamber to the lower vacuum chamber and having
an aperture, the aperture providing a path for droplets formed from the conductive or semi-conductive spray fluid to pass from the upper vacuum chamber to the lower vacuum chamber,
a conductive extractor ring having an extractor ring aperture, the extractor ring aperture being axially aligned with the source tip and the aperture,
the conductive extractor ring being connected to
an opposite pole of the power supply, wherein a potential of the power supply is adjusted such that
a Taylor Cone is formed at the source tip resulting in
a plume of charged droplets being attracted to the extractor ring aperture and forming a jet of droplets passing through the aperture, the jet of droplets transferring gas from the upper vacuum chamber to the lower vacuum chamber,
the conductive or semi-conductive spray fluid having a vapor pressure as low as $10^{-10}$ torr, and the conductivity of the conductive or semi-conductive spray fluid being such that it remains in the range $10^{-5}$-$10^{-3}$ Si/m.

* * * * *